US011718074B2

(12) United States Patent
Nonaka et al.

(10) Patent No.: US 11,718,074 B2
(45) Date of Patent: Aug. 8, 2023

(54) FILM, MOLDED PRODUCT, AND METHOD FOR PRODUCING FILM

(71) Applicant: KURARAY CO., LTD., Kurashiki (JP)

(72) Inventors: Yasuhiro Nonaka, Kurashiki (JP); Makoto Suzuki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 874 days.

(21) Appl. No.: 16/305,681

(22) PCT Filed: May 31, 2017

(86) PCT No.: PCT/JP2017/020350
§ 371 (c)(1),
(2) Date: Nov. 29, 2018

(87) PCT Pub. No.: WO2017/209212
PCT Pub. Date: Dec. 7, 2017

(65) Prior Publication Data
US 2020/0324525 A1 Oct. 15, 2020

(30) Foreign Application Priority Data
May 31, 2016 (JP) ................................. 2016-108066

(51) Int. Cl.
B32B 27/08 (2006.01)
B32B 25/08 (2006.01)
(Continued)

(52) U.S. Cl.
CPC ............ B32B 27/08 (2013.01); B32B 25/08 (2013.01); B32B 25/14 (2013.01); B32B 27/302 (2013.01);
(Continued)

(58) Field of Classification Search
CPC ....... B32B 27/08; B32B 25/08; B32B 27/302; B32B 27/306; B32B 27/40;
(Continued)

(56) References Cited

U.S. PATENT DOCUMENTS 11,020,942 B2* 6/2021 Suzuki .................. B32B 25/14
2008/0293887 A1* 11/2008 Sato ........................ C08L 25/06
525/190

(Continued)

FOREIGN PATENT DOCUMENTS

CN 103732398 A 4/2014
EP 2 554 372 A1 2/2013
(Continued)

OTHER PUBLICATIONS

Extended European Search Report dated Oct. 17, 2019 in European Patent Application No. 17806763.3, 7 pages.

(Continued)

Primary Examiner — Callie E Shosho
Assistant Examiner — Steven A Rice
(74) Attorney, Agent, or Firm — Oblon, McClelland, Maier & Neustadt, L.L.P.

(57) ABSTRACT

A film with a gas barrier resin having a glass transition temperature of 70° C. or below and an elastomer, and having an oxygen permeability coefficient of 200 mL/(m²·day·atm) or less. In a case where tension is applied to stretch the film in a machine direction (MD) at 20° C. such that a twofold increase in length of the film is kept for 30 seconds, and then the tension is released, a ratio $L_2/L_1$ is 1.5 or less, where $L_1$ denotes the length of the film prior to application of the tension and $L_2$ denotes the length of the film subsequent to release of the tension. An elongation ratio at break $E_{TD}/E_{MD}$ of the film is preferably 0.9 or more and 1.7 or less, there (Continued)

$E_{MD}$ denotes the elongation at break in MD and $E_{TD}$ denotes the elongation at break in the transverse direction (TD).

11 Claims, 3 Drawing Sheets

(51) Int. Cl.
| | |
|---|---|
| *B32B 25/14* | (2006.01) |
| *B32B 27/30* | (2006.01) |
| *B32B 27/40* | (2006.01) |
| *C08J 5/18* | (2006.01) |
| *B29C 48/08* | (2019.01) |
| *B29K 75/00* | (2006.01) |
| *B29K 23/00* | (2006.01) |

(52) U.S. Cl.
CPC ............ *B32B 27/306* (2013.01); *B32B 27/40* (2013.01); *C08J 5/18* (2013.01); *B29C 48/08* (2019.02); *B29K 2023/083* (2013.01); *B29K 2075/00* (2013.01); *B29K 2995/0067* (2013.01); *B32B 2250/05* (2013.01); *B32B 2250/24* (2013.01); *B32B 2250/42* (2013.01); *B32B 2307/7244* (2013.01); *B32B 2439/70* (2013.01); *C08J 2329/04* (2013.01); *C08J 2425/04* (2013.01); *C08J 2475/04* (2013.01)

(58) Field of Classification Search
CPC ............ B32B 2250/05; B32B 2250/24; B32B 2250/42; B32B 2307/7244; B32B 2439/70; B32B 25/04; B32B 2250/03; B32B 2250/40; B32B 2264/0207; B32B 2264/0221; B32B 2264/0235; B32B 2264/0292; B32B 2270/00; B32B 2307/514; B32B 2307/732; B32B 2553/00; B32B 25/16; B32B 27/28; B32B 2307/50; B32B 2605/00; C08J 5/18; C08J 2329/04; C08J 2425/04; C08J 2475/04; B29C 48/08; B29K 2023/083; B29K 2075/00; B29K 2995/0067
USPC ...................................... 428/424.2
See application file for complete search history.

(56) References Cited

U.S. PATENT DOCUMENTS

| | | | |
|---|---|---|---|
| 2009/0012236 A1* | 1/2009 | Isoyama | ................. B32B 25/08 525/59 |
| 2011/0024015 A1 | 2/2011 | Takahashi et al. | |
| 2012/0225990 A1* | 9/2012 | Jacob | .................... C08L 23/283 524/503 |
| 2014/0076474 A1 | 3/2014 | Amamoto et al. | |
| 2014/0096882 A1 | 4/2014 | Kitano et al. | |
| 2014/0124114 A1* | 5/2014 | Hayashi | .................. B29C 48/18 152/510 |
| 2015/0007921 A1* | 1/2015 | Tsunoda | .................... B60C 5/14 152/510 |

FOREIGN PATENT DOCUMENTS

| | | |
|---|---|---|
| EP | 2 716 444 A1 | 4/2014 |
| EP | 3 466 683 A1 | 4/2019 |
| JP | 7-3089 A | 1/1995 |
| JP | 2012-250356 A | 12/2012 |
| JP | 2012-250560 A | 12/2012 |
| JP | 2012-250562 A | 12/2012 |
| JP | 2013-10350 A | 1/2013 |
| JP | 2014-34647 A | 2/2014 |
| JP | 2014-51037 A | 3/2014 |
| WO | WO 2009/123229 A1 | 10/2009 |
| WO | WO 2012/164917 A1 | 12/2012 |
| WO | WO-2017162656 A1 * | 9/2017 ............... C08J 3/26 |

OTHER PUBLICATIONS

International Search Report dated Aug. 1, 2017 in PCT/JP2017/020350 (with English translation), 5 pages.

"Series Name and Typical Characteristic Values of "EVAL®" Resin" EVAL Resin & Film, Kuraray Co., Ltd., [retrieval date Jul. 14, 2017 (Jul. 14, 2017], Internet, http://www.eval.jp/media/56951/eval_general_btochure_jp_20110131.pdf>, Jan. 31, 2011, p. 8 (with English translation).

* cited by examiner (a)

(b)

(a)
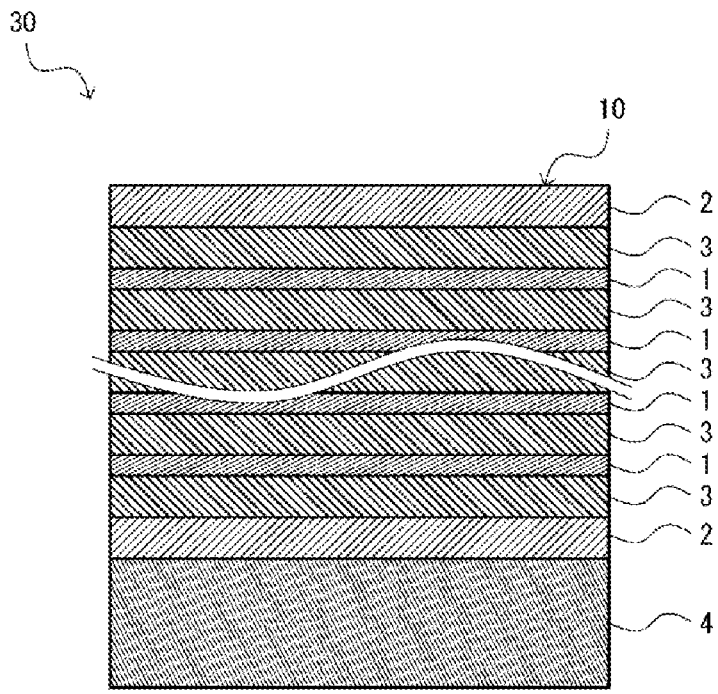
(b)
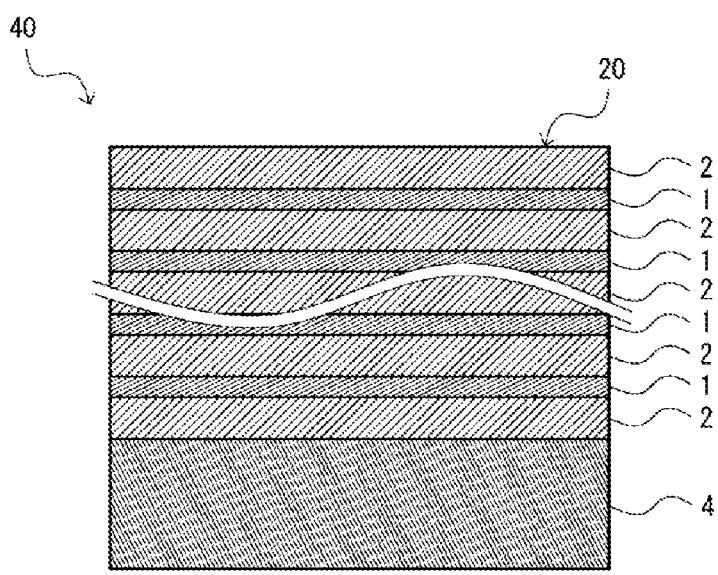
F I G. 3

FILM, MOLDED PRODUCT, AND METHOD FOR PRODUCING FILM

TECHNICAL FIELD

The present invention relates to a film, a molded product, and a method for producing a film.

BACKGROUND ART

In recent years, films such as stretchable polyolefin films find use as stretch films for preventing, for example, a load collapse, contamination of and/or damage to items during transportation or for wrapping dressed meat, fresh fish, vegetables, fruits, etc. These films have already been introduced to the market.

These stretch films have recently found a wide range of uses as described above. Meanwhile, it is difficult to provide a stretch film having both stretchability and gas barrier properties, namely, the properties of effectively blocking the entry of water vapor and/or oxygen. To be available for uses which require the gas barrier properties, such a stretch film with the current state of the art comes down in thickness at the sacrifice of stretchability, or is wound in many layers.

As a breakthrough to these circumstances, a stretch film that includes a gas barrier layer containing a specific allyl alcohol polymer has been proposed in Japanese Unexamined Patent Application, Publication No. 2014-51037.

After being stretched through application of tension during use and released from tension, the stretch film disclosed in Japanese Unexamined Patent Application, Publication No. 2014-51037 may not exhibit the gas barrier properties as much as it did before being stretched. Once the gas barrier properties have been deteriorated after release of tension on the stretch film, it will be difficult for the stretch film under repeated use to maintain its gas barrier properties.

In some cases, a film having gas barrier properties and a filmy rubber material are bonded together so as to be used as a product required to have gas barrier properties, such as an inner liner for a pneumatic tire, a silage film, a gasket, an inner package of an accumulator, an inflated ball or an air spring. The gas barrier properties of these products may be deteriorated due to application of tension to the products, for example, during use of the products.

PRIOR ART DOCUMENTS

Patent Documents

Patent Document 1: Japanese Unexamined Patent Application, Publication No. 2014-51037

SUMMARY OF THE INVENTION

Problems to be Solved by the Invention

The present invention was made in view of the foregoing circumstances, and an object of the present invention is to provide a film usable with minimized deterioration in gas barrier properties, a molded product including the same, and a method for producing a film.

Means for Solving the Problems

According to an aspect of the invention made for solving the problems described above, a film contains a gas barrier resin having a glass transition temperature of 70° C. or below and an elastomer, and has an oxygen permeability coefficient of 200 mL/(m$^2$·day·atm) or less. In a case where tension is applied to stretch the film in a machine direction (MD) at 20° C. such that a twofold increase in length of the film is kept for 30 seconds, and then the tension is released, a ratio $L_2/L_1$ of the film is 1.5 or less, where $L_1$ denotes the length of the film in MD prior to application of the tension and $L_2$ denotes the length of the film in MD subsequent to release of the tension.

It is to be noted that the term "glass transition temperature" as referred to herein means a value determined based on a differential scanning calorimetry (DSC) in accordance with JIS K 7121 (2012). The term "oxygen permeability coefficient" as referred to herein means the oxygen permeability determined at 20° C. and at a relative humidity of 65% in accordance with JIS K 7126-2 (2006). The term "machine direction (MD)" as referred to herein means the direction in which the film is conveyed during molding, and is the orientation direction of polymer crystals in a gas barrier resin. The orientation direction of polymer crystals in the gas barrier resin may be determined by, for example, wide angle X-ray diffraction or birefringence measurement.

Owing to the above-described features, the film is usable with minimized deterioration in gas barrier properties. Although not completely clarified, the reason why the above-described features produce this effect is inferred as follows. The film is formed from a gas barrier resin having a glass transition temperature of 70° C. or below, and thus generation of cracks in the gas barrier resin is presumably inhibited while the film is stretched. Furthermore, a post/pre tensioned film length ratio $L_2/L_1$ in MD is 1.5 or less, and the reduction in the film thickness caused by stretching of the film and release of the tension on the film can be presumably minimized accordingly. Thus, the film is usable with minimized deterioration in gas barrier properties.

An elongation ratio at break $E_{TD}/E_{MD}$ of the film is preferably 0.9 or more and 1.7 or less, where $E_{MD}$ denotes the elongation at break of the film in MD and $E_{TD}$ denotes the elongation at break of the film in the transverse direction (TD). When the ratio $E_{TD}/E_{MD}$ falls within the above range, the film has enhanced impact resistance and is usable with further minimized deterioration in gas barrier properties. The term "transverse direction (TD)" as referred to herein means the width direction of the film during molding, and is the direction orthogonal to the orientation direction of polymer crystals in the gas barrier resin. The term "elongation at break" as referred to herein means the elongation at break determined at 23° C. and at a relative humidity of 50% in accordance with ISO527-2.

The gas barrier resin is preferably an ethylene-vinyl alcohol copolymer. When the ethylene-vinyl alcohol copolymer is used as the gas barrier resin, the gas barrier properties and the melt moldability can be enhanced.

The film preferably includes at least one gas barrier layer (A) formed from a polymer containing the gas barrier resin and at least one elastomer layer (B) formed from a polymer containing the elastomer. Owing to this feature, the film is capable of exhibiting enhanced stretchability while maintaining its gas barrier properties.

The total number of the gas barrier layer (A) and the elastomer layer (B) is preferably 7 or more, more preferably 9 or more, and particularly preferably 15 or more. When being bent, for example, the film is capable of exhibiting enhanced durability because this configuration enables inhibition of consecutive generation of defects such as pinholes and cracks. The film preferably has a laminated structure in which the gas barrier layer (A) and the elastomer layer (B)

are each laminated alternately. The film is capable of exhibiting further enhanced durability because this configuration enables inhibition of consecutive generation of defects such as pinholes and cracks.

The film preferably includes as the elastomer layer (B), at least one elastomer layer (B1) formed from a polymer containing a hydrocarbon elastomer. At least one of the at least one elastomer layer (B1) is preferably laminated as an outermost layer. Owing to this configuration, the adherence of the elastomer layer (B1) being the outermost layer to a conveyor roller can be inhibited during molding of the film, and thus excessive stretching of the film can be inhibited during molding. As a result, the post/pre tensioned film length ratio $L_2/L_1$ in MD can be controlled to fall within a more appropriate range.

The polymer from which the elastomer layer (B1) is formed preferably contains a styrene elastomer having a double bond. When the film and a filmy rubber material are bonded together so as to be used as, for example, an inner liner for a pneumatic tire or an inner package of an accumulator, a crosslinking reaction occurs between the elastomer layer (B1) being the outermost layer and the rubber material through vulcanization or the like, and as a result, the adhesion between the elastomer layer (B1) and the rubber material can be enhanced.

It is preferred that the film further includes as the elastomer layer (B), an elastomer layer (B2) formed from a polymer other than the polymer containing a hydrocarbon elastomer. Owning to this feature, the film is capable of exhibiting further enhanced stretchability. In this case, the polymer from which the elastomer layer (B2) is formed preferably contains a polyurethane elastomer. Owning to this feature, the film is capable of exhibiting still further enhanced stretchability.

According to another aspect of the present invention made for solving the problems described above, a molded product includes the film of the above aspect of the present invention. The molded product includes the film of the above aspect of the present invention, thus being advantageous in that the film can maintain its gas barrier properties even after being stretched during molding of or use of the product.

It is preferred that the film further includes a diene rubber layer (C) laminated on an outer face of the film. Owing to this configuration, the molded product can be used as an inner liner for a pneumatic tire, a silage film, a gasket, an inner package of an accumulator, an inflated ball, an air spring, or the like.

According to a still another aspect of the invention made for solving the problems described above, a method for producing the film of the above aspect of the present invention includes coextruding: a polymer containing a gas barrier resin; and a polymer containing an elastomer. The method enables easy and reliable production of the film of the above aspect of the present invention including the gas barrier layer (A) and the elastomer layer (B).

Effects of the Invention

The present invention provides the film usable with minimized deterioration in gas barrier properties, the molded product including the same, and the method for producing a film.

BRIEF DESCRIPTION OF THE DRAWINGS

FIG. 3(a) is a schematic cross-sectional view of a molded product including the film shown in FIG. 1(a). FIG. 3(b) is a schematic cross-sectional view of a molded product including the film shown in FIG. 1(b).

DESCRIPTION OF EMBODIMENTS

Figure 1:
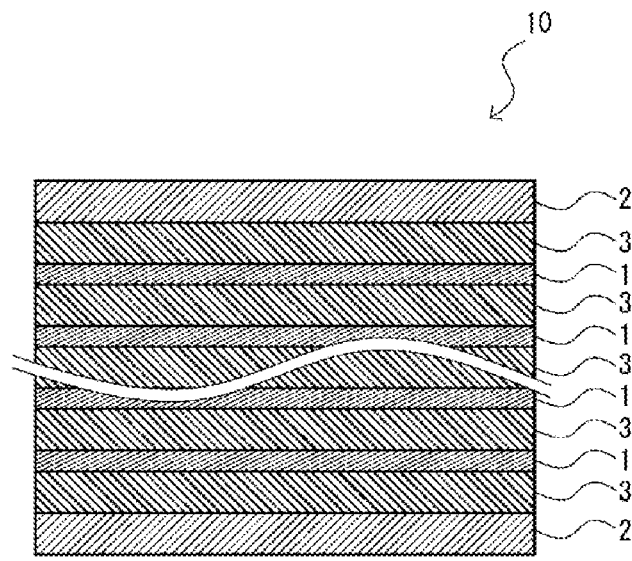
FIG. 1(a) is a schematic cross-sectional view of a film according to one embodiment of the present invention.
FIG. 1(b) is a schematic cross-sectional view of a film different from the film shown in FIG. 1(a) and obtained according to another embodiment of the present invention.
Figure 1:
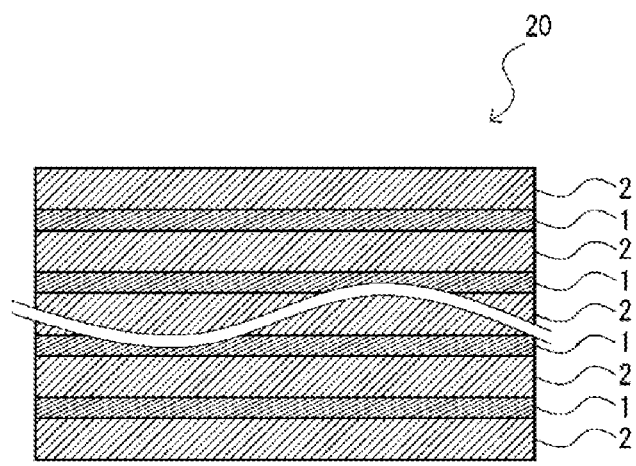

A film according to one embodiment of the present invention, a method for producing the same, and a molded product will be described below in detail.

Film

A film according to one embodiment of the present invention contains: a gas barrier resin having a glass transition temperature (hereinafter, also referred to as "Tg") of 70° C. or below; and an elastomer. The film according to the present embodiment has an oxygen permeability coefficient of 200 mL/(m²·day·atm) or less. In a case where tension is applied to stretch the film in MD at 20° C. such that a twofold increase in length of the film is kept for 30 seconds, and then the tension is released, a length ratio $L_2/L_1$ in MD is 1.5 or less, where $L_1$ denotes the length of the film in MD prior to application of the tension and $L_2$ denotes the length of the film in MD subsequent to release of the tension. Owing to the above-described feature, the film according to the present embodiment is usable with minimized deterioration in gas barrier properties.

The structure of the film according to the present embodiment is not limited, and the film may have any structure as long as the above-described features are achieved. The film may be, for example, a single-layer film formed from a resin composition in which elastomer particles are dispersed in a gas barrier resin. The film is preferably a laminated film including at least one gas barrier layer (A) (hereinafter, also referred to as "A layer") formed from a polymer containing a gas barrier resin and at least one elastomer layer (B) (hereinafter, also referred to as "B layer") formed from a polymer containing an elastomer. Such a laminated film is capable of exhibiting enhanced stretchability while maintaining its gas barrier properties.

Gas Barrier Resin

The gas barrier resin is a polymer that is a principal component of the A layer. The lower limit of the content of the gas barrier resin in the A layer (a material for forming the A layer) is, for example, 60% by mass, preferably 90% by mass, more preferably 95% by mass, still more preferably 99% by mass, and even more preferably 99.9% by mass. The gas barrier resin has the function of preventing permeation of gases and has a Tg of 70° C. or below. The "resin having the function of preventing permeation of gases" as referred to herein is a resin that can provide a film having, for example, an average thickness of 20 μm with an oxygen permeability coefficient of 200 mL/(m²·day·atm) or less, preferably 150 mL/(m²·day·atm) or less, more preferably 100 mL/(m²·day·atm) or less, still more preferably 50 mL/(m²·day·atm) or less, and particularly preferably 10 mL/(m²·day·atm) or less.

The gas barrier resin may be any resin having a Tg of 70° C. or below and selected from resins such as an ethylene-vinyl alcohol copolymer (hereinafter, also referred to as "EVOH"), a polyamide, a polyester, a polyvinylidene chloride, an acrylonitrile copolymer, a polyvinylidene fluoride, a polychlorotrifluoroethylene and a polyvinyl alcohol. The Tg can be controlled through adjustment of the constitution of a monomer from which the resin is formed, the tacticity, the chain structure, the molecular weight of the resin, and the like.

The upper limit of the Tg of the gas barrier resin may be 70° C., and is preferably 65° C., and more preferably 60° C. When the Tg is at or below the preferred upper limit, generation of cracks in the gas barrier resin can be further inhibited while the film is stretched, and thus the film is usable with further minimized deterioration in gas barrier properties. The lower limit of the Tg of the gas barrier resin is not particularly limited, and is preferably 30° C., and more preferably 40° C. in light of moldability.

Among these gas barrier resins, a polyamide, a polyester and EVOH are preferred in light of gas barrier properties, and EVOH is more preferred in light of not only the gas barrier properties but also melt moldability and, if applicable, enhanced adhesion between the A layer and the B layer of the laminated film.

Polyamide

The polyamide is a polymer having an amide bond, and can be obtained by ring-opening polymerization of a lactam, polycondensation of an aminocarboxylic acid, polycondensation of a diamine with a dicarboxylic acid, or the like.

Specific examples of the polyamide include: aliphatic polyamides such as polycaprolactam (nylon 6), polylaurolactam (nylon 12), polyhexamethylenediadipamide (nylon 66), polyhexamethyleneazelamide (nylon 69), polyhexamethylenesebacamide (nylon 610), nylon 46, nylon 6/66, nylon 6/12, and a condensation product of 11-aminoundecanoic acid (nylon 11); aromatic polyamides such as polyhexamethyleneisophthalamide (nylon 6I), a m-xylylenediamine/adipic acid copolymer (nylon MXD6), and a m-xylylenediamine/adipic acid/isophthalic acid copolymer; and the like. The polyamide may be used alone or as a mixture of two or more types thereof. Among these polyamides, nylon 6 and aromatic polyamides are preferred owing to their superior gas barrier properties, and nylon MXD6 is more preferred.

Polyester

The polyester is a polymer having an ester bond, and can be obtained by, for example, polycondensation of a polyvalent carboxylic acid with a polyol. Specific examples of the polyester include polyethylene terephthalate (PET), polyethylene naphthalate (PEN), polyglycolic acid (PGA), polylactic acids (PLA), wholly aromatic liquid crystal polyesters, and the like. The polyester may be used alone or as a mixture of two or more types thereof. Among these polyesters, PGA, PLA and wholly aromatic liquid crystal polyesters are preferred in light of superiority in gas barrier properties, and PGA is more preferred.

EVOH

EVOH is a polymer having an ethylene unit and a vinyl alcohol unit as principal structural units. It is to be noted that EVOH may also include one type or a plurality of types of structural units other than the ethylene unit and the vinyl alcohol unit.

EVOH is typically obtained by polymerizing ethylene with a vinyl ester and saponifying the resulting ethylene-vinyl ester copolymer.

The lower limit of the content of the ethylene unit in EVOH (i.e., the proportion of the number of ethylene units with respect to the total number of monomer units in EVOH) is preferably 3 mol %, more preferably 10 mol %, still more preferably 20 mol %, and particularly preferably 25 mol %. The upper limit of the content of the ethylene unit in EVOH is preferably 70 mol %, more preferably 60 mol %, still more preferably 55 mol %, and particularly preferably 50 mol %. When the content of the ethylene unit in EVOH is less than the lower limit, the gas barrier properties and the like of the film under highly humid conditions may be deteriorated, or melt moldability may be impaired. When the content of the ethylene unit in EVOH is greater than the upper limit, the gas barrier properties of the film may be deteriorated.

The lower limit of the degree of saponification of EVOH (i.e., the proportion of the number of vinyl alcohol units with respect to the total number of vinyl alcohol units and vinyl ester units in EVOH) is preferably 80 mol %, more preferably 95 mol %, and particularly preferably 99 mol %. The upper limit of the degree of saponification of EVOH is preferably 99.99 mol %. When the degree of saponification of EVOH is less than the lower limit, melt moldability may be impaired, and additionally the gas barrier properties of the film may be deteriorated, or the coloring resistance and/or moisture resistance may be unsatisfactory. When the degree of saponification of EVOH is greater the upper limit, the improvement of the gas barrier properties and the like may not be that satisfactory despite increased costs of producing EVOH. Such EVOH may be used alone; however, an embodiment in which such EVOH is blended with EVOH having a degree of saponification greater than 99 mol % is also suitable.

EVOH preferably has a structural unit (I) represented by the following formula (I), a structural unit (II) represented by the following formula (II), a structural unit (III) represented by the following formula (III), or a combination thereof. When the EVOH has such a structural unit, the flex resistance of the laminate obtained can be more improved.

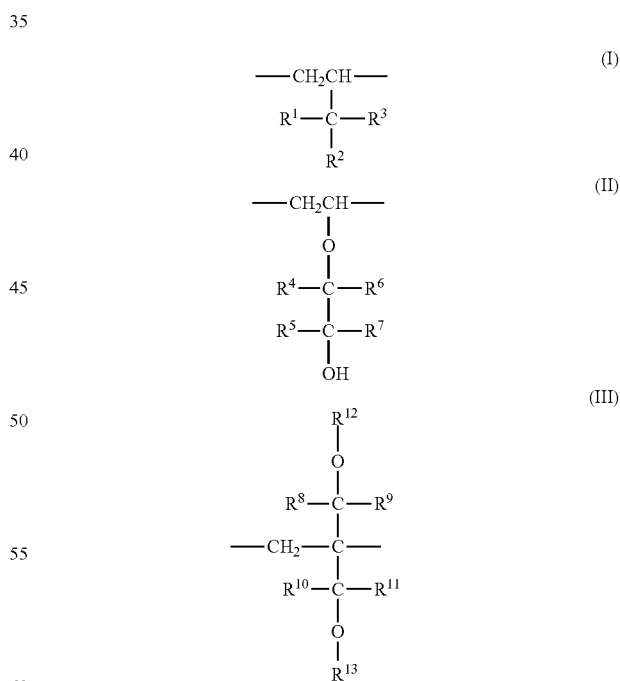

In the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein $R^1$ and $R^2$, $R^2$ and $R^3$, or $R^1$ and $R^3$ may be bonded to each other, and a part or all of hydrogen atoms included in the aliphatic hydrocarbon group having 1 to 10 carbon atoms, the alicyclic hydrocarbon group having 3 to 10 carbon atoms, or the aromatic hydrocarbon group having 6 to 10 carbon atoms may be substituted with a hydroxyl group, a carboxyl group or a halogen atom.

In the above formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein $R^4$ and $R^5$, or $R^6$ and $R^7$ may be bonded to each other, and a part or all of hydrogen atoms included in the aliphatic hydrocarbon group having 1 to 10 carbon atoms, the alicyclic hydrocarbon group having 3 to 10 carbon atoms, or the aromatic hydrocarbon group having 6 to 10 carbon atoms may be substituted with a hydroxyl group, an alkoxy group, a carboxyl group or a halogen atom.

In the above formula (III), $R^8$, $R^9$, $R^{10}$ and $R^{11}$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein a part or all of hydrogen atoms included in the aliphatic hydrocarbon group having 1 to 10 carbon atoms, the alicyclic hydrocarbon group having 3 to 10 carbon atoms, or the aromatic hydrocarbon group having 6 to 10 carbon atoms may be substituted with a hydroxyl group, an alkoxy group, a carboxyl group or a halogen atom; and $R^{12}$ and $R^{13}$ each independently represent a hydrogen atom, a formyl group or an alkanoyl group having 2 to 10 carbon atoms.

The lower limit of the content of the structural unit (I), (II) or (III) with respect to all structural units is preferably 0.5 mol %, more preferably 1 mol %, and still more preferably 1.5 mol %. The upper limit of the content of the structural unit (I), (II) or (III) with respect to all structural units is preferably 30 mol %, more preferably 15 mol %, and still more preferably 10 mol %. When EVOH has the structural unit represented by the above formula (I), (II) or (III) at a proportion falling within the above range, the polymer from which the A layer is formed exhibits improved flexibility and improved processing characteristics, and consequently, the stretchability, thermoformability and the like of the film can be improved.

In the structural unit (I), (II) or (III), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group and the like.

In the structural unit (I), it is preferred that $R^1$, $R^2$ and $R^3$ each independently represent a hydrogen atom, a methyl group, an ethyl group, a hydroxy group, a hydroxymethyl group or a hydroxyethyl group, and it is more preferred that $R^1$, $R^2$ and $R^3$ each independently represent a hydrogen atom, a methyl group, a hydroxyl group or a hydroxymethyl group. When $R^1$, $R^2$ and $R^3$ are as described above, the stretchability and thermoformability of the film can be further improved.

The process for allowing EVOH to include the structural unit (I) is not particularly limited. For example, a method may be employed in which a monomer that leads to the structural unit (I) is copolymerized in the polymerization of ethylene with a vinyl ester. Examples of the monomer that leads to the structural unit (I) include: alkenes such as propylene, butylene, pentene and hexene; and alkenes having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, propylene, 3-acyloxy-1-propene, 3-acyloxy-1-butene, 4-acyloxy-1-butene and 3,4-diacetoxy-1-butene are preferred in light of reactivity for copolymerization and the gas barrier properties of the laminate obtained. The alkene having an ester leads to the structural unit (I) during the saponification reaction.

In the above structural unit (II), it is preferred that $R^4$ and $R^5$ both represent a hydrogen atom. In particular, it is more preferred that $R^4$ and $R^5$ both represent a hydrogen atom, one of $R^6$ and $R^7$ represents an aliphatic hydrocarbon group having 1 to 10 carbon atoms, and the other one of $R^6$ and $R^7$ represents a hydrogen atom. The aliphatic hydrocarbon group is preferably an alkyl group or an alkenyl group. In light of particular importance of the gas barrier properties of the film, it is particularly preferred that one of $R^6$ and $R^7$ represents a methyl group or an ethyl group, and the other represents a hydrogen atom. Alternatively, it is also particularly preferred that one of $R^6$ and $R^7$ represents a substituent represented by $(CH_2)_hOH$ (where h is an integer of 1 to 8), and the other represents a hydrogen atom. In the substituent represented by $(CH_2)_hOH$, h is preferably an integer of 1 to 4, more preferably 1 or 2, and particularly preferably 1.

The method for allowing EVOH to include the structural unit (II) is not particularly limited. For example, a method may be employed in which EVOH obtained by a saponification reaction is allowed to react with a monovalent epoxy compound such that the structural unit (II) is included in the EVOH. As the monovalent epoxy compound, a compound represented by one of the following formulae (IV) to (X) is suitably used.

(IV)

(V)

(VI)

(VII)

(VIII)

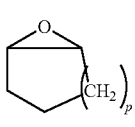

(IX)

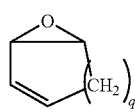

(X)

In the above formulae (IV) to (X), $R^{14}$, $R^{15}$, $R^{16}$, $R^{17}$ and $R^{18}$ each independently represent a hydrogen atom, an aliphatic hydrocarbon group (such as an alkyl group or an alkenyl group) having 1 to 10 carbon atoms, an alicyclic hydrocarbon group (such as a cycloalkyl group or a cycloalkenyl group) having 3 to 10 carbon atoms, or an aliphatic hydrocarbon group (such as a phenyl group) having 6 to 10 carbon atoms; and i, j, k, p and q are each independently an integer of 1 to 8.

Examples of the monovalent epoxy compound represented by the above formula (IV) include epoxyethane (ethylene oxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethylbenzene, 1-phenyl-1,2-propane, 3-phenyl-1,2-epoxypropane, and the like.

Examples of the monovalent epoxy compound represented by the above formula (V) include various types of alkyl glycidyl ethers.

Examples of the monovalent epoxy compound represented by the above formula (VI) include various types of alkylene glycol monoglycidyl ethers.

Examples of the monovalent epoxy compound represented by the above formula (VII) include various types of alkenyl glycidyl ethers.

Examples of the monovalent epoxy compound represented by the above formula (VIII) include various types of epoxy alkanols such as glycidol.

Examples of the monovalent epoxy compound represented by the above formula (IX) include various types of epoxy cycloalkanes.

Examples of the monovalent epoxy compound represented by the above formula (X) include various types of epoxy cycloalkenes.

Among the monovalent epoxy compounds, epoxy compounds having 2 to 8 carbon atoms are preferred. In particular, the monovalent epoxy compound more preferably has 2 to 6 atoms, and still more preferably has 2 to 4 carbon atoms, in light of ease in handling the compound and in light of reactivity. Among the monovalent epoxy compounds represented by the above formulae, the compound represented by the formula (IV) and the compound represented by the formula (V) are particularly preferred. Specifically, in light of reactivity with EVOH and the gas barrier properties of the laminate obtained, 1,2-epoxybutane, 2,3-epoxybutane, epoxypropane, epoxyethane and glycidol are preferred, and of these, epoxypropane and glycidol are particularly preferred.

In the structural unit (III), $R^8$, $R^9$, $R^{10}$ and $R^{11}$ each preferably represent a hydrogen atom or an aliphatic hydrocarbon group having 1 to 5 carbon atoms. In particular, the aliphatic hydrocarbon group is preferably a methyl group, an ethyl group, a n-propyl group, an isopropyl group, a n-butyl group, an isobutyl group, a tert-butyl group or a pentyl group.

The method for allowing EVOH to include the structural unit (III) is not particularly limited. For example, such EVOH may be produced by using the method described in Japanese Unexamined Patent Application, Publication No. 2014-034647.

In the case where the film according to the present embodiment is structurally configured as the laminated film described above, the polymer for forming the A layer (the material for forming the A layer) may contain one or a plurality of types of additives such as a phosphate compound, a carboxylic acid, a boron compound and a metal salt. When the polymer for forming the A layer contains these additives, various performances of the laminated film can be improved.

The polymer for forming the A layer may be constituted of the gas barrier resin alone or may contain a resin other than the gas barrier resin. The A layer (the material for forming the A layer) may contain, in addition to the polymer, a variety of components such as a heat stabilizer, an ultraviolet ray absorbing agent, an antioxidant, a colorant and a filler.

Elastomer

The elastomer is a polymer that is a principal component of the B layer. The lower limit of the content of the elastomer in the B layer (a material for forming the B layer) is, for example, 60% by mass, preferably 90% by mass, more preferably 95% by mass and still more preferably 97% by mass, and may be even more preferably 99% by mass and further more preferably 99.9% by mass. The elastomer is a resin having elasticity at around normal temperature, and is a component that imparts stretchability. Specifically, the elastomer as referred to above is the resin characterized in that after being stretched to gain a twofold increase in length at 20° C. and maintained as it is for 1 minute, it contracts to be less than 1.5 times longer than its original length within 1 minute of release of tension. Structurally, the elastomer is typically a polymer having a hard segment and a soft segment in its polymer chain. In general, the elastomer is thermoplastic.

Examples of the elastomer include hydrocarbon elastomers (e.g., a styrene elastomer, an olefin elastomer, a diene elastomer), vinyl chloride elastomers, chlorinated polyethylene elastomers, polyurethane elastomers, polyester elastomers, polyamide elastomers and fluoro resin elastomers, and the like.

In the case where the film according to the present embodiment is structurally configured as the laminated film, it is preferred that the laminated film includes as the B layer, one or a plurality of elastomer layers (B1) (hereinafter, also referred to as "B1 layer") formed from the polymer containing a hydrocarbon elastomer, and that the one elastomer layer (B1) or at least one of the plurality of elastomer layers (B1) is laminated as an outermost layer (an outer elastomer layer). Owing to this configuration, the adherence of the elastomer layer (B1) being the outermost layer to a conveyor roller can be inhibited during molding of the laminated film, and thus excessive stretching of the laminated film can be inhibited during molding. As a result, the post/pre tensioned film length ratio $L_2/L_1$ in MD can be controlled to fall within a more appropriate range.

The hydrocarbon elastomer as referred to herein means an elastomer including a hydrocarbon as a principal monomer unit, and examples thereof include styrene elastomers, olefin elastomers, diene elastomers, and the like. Of these, the styrene elastomers and the olefin elastomers are preferred, and the styrene elastomers are more preferred. Owing to the low polarity and the like of the hydrocarbon elastomer, the adherence to a conveyor roller can be inhibited, and thus excessive stretching of the laminated film can be inhibited during molding.

Styrene Elastomer

In general, the styrene elastomer has an aromatic vinyl based polymer block (hard segment) and a rubber block (soft segment). The aromatic vinyl based polymer moiety serves as a bridging point through formation of physical crosslinking, whereas the rubber block imparts rubber elasticity.

Examples of the styrene elastomer include styrene-butadiene-styrene block copolymers (SBS), styrene-isoprene-styrene block copolymers (SIS), styrene-isobutylene-styrene block copolymers (SIBS), styrene-ethylene/butylene-styrene block copolymers (SEBS), styrene-ethylene/propylene-styrene block copolymers (SEPS), polymers obtained by degeneration of these copolymers, and the like. Of these, styrene elastomers having a double bond are preferred, SBS, SIS, SEBS and combinations thereof are more preferred, and SBS, SIS and a combination thereof are still more preferred. In the case where the laminated film and a filmy rubber material are to be bonded together so as to be used as, for example, an inner liner for a pneumatic tire or an inner package of an accumulator, the specific elastomer included as the styrene elastomer in the polymer from which the B1 layer being the outermost layer is formed allows a crosslinking reaction to occur between the B1 layer and the rubber material through vulcanization or the like, and as a result, the adhesion between the elastomer layer (B1) and the rubber material can be enhanced.

The styrene elastomer preferably includes a functional group (hereinafter, also referred to as "functional group I") that reacts with a group included in the other layer (e.g., the A layer, a B2 layer described later) to form a bond. The adhesion between the B1 layer and the other layer can be enhanced accordingly. Examples of the group included in the other layer include a hydroxyl group of EVOH, a group of the other elastomer such as a polyurethane elastomer (e.g., a carbamate group, an isocyanate group), and the like. Examples of the functional group I include a carboxy group, an epoxy group, an amino group, and the like. Of these, a carboxy group and an epoxy group are preferred, and an epoxy group is more preferred. The styrene elastomer preferably has an epoxy group in the main chain. The expression of "has an epoxy group in the main chain" means that a cyclic ether structure is included in the main chain, and the styrene elastomer preferably has a three-membered cyclic ether structure in the main chain.

The styrene elastomer having a carboxy group (carboxylic acid-modified styrene elastomer) can be obtained by, for example, (1) chemically bonding an unsaturated carboxylic acid or an anhydride thereof to a styrene elastomer through an addition reaction or a graft reaction, or (2) copolymerizing an aromatic vinyl compound with: a conjugated diene compound or a hydrogenated product thereof; and an unsaturated carboxylic acid or an anhydride thereof. Examples of the unsaturated carboxylic acid and an anhydride thereof include maleic acid, maleic anhydride, and the like.

The styrene elastomer having an epoxy group in the main chain (epoxy-modified styrene elastomer) can be obtained by, for example, allowing a styrene elastomer or a partially hydrogenated styrene elastomer to react with an epoxidizing agent in an inert solvent. The reaction with the epoxidizing agent causes epoxidation of a carbon-carbon double bond of the rubber block (soft segment).

The epoxidizing agent is exemplified by peracids, hydroperoxides and the like. Examples of the peracids include performic acid, peracetic acid, perbenzoic acid, trifluoro peracetic acid, and the like. Examples of the hydroperoxides include hydrogen peroxide, tert-butyl hydroperoxide, cumene hydroperoxide, and the like.

Olefin Elastomer

The olefin elastomer is exemplified by thermoplastic elastomers in which a polyolefin moiety such as polypropylene or polyethylene is included as a hard segment and an ethylene-propylene-diene copolymerized rubber moiety or the like is included as a soft segment. Also, examples of the olefin elastomer include a maleic anhydride-modified ethylene-butene-1 copolymer, a maleic anhydride-modified ethylene-propylene copolymer, a halogenated butyl rubber, modified polypropylene, modified polyethylene, and the like Diene Elastomer Examples of the diene elastomer include a 1,2-polybutadiene elastomer, a trans-1,4-polyisoprene elastomer, a hydrogenated conjugated diene elastomer, epoxidized natural rubber, modified products of these with maleic anhydride, and the like.

In the case where the laminated film includes a plurality of the B layers, the B layers may be composed of: only the B1 layers, only elastomer layers different from the B1 layer; or the B1 layer(s) and the elastomer layer(s) different from the B1 layer. Examples of the elastomer layer different from the B1 layer include an elastomer layer (B2) (hereinafter, may be also referred to as "B2 layer") formed from a polymer other than the polymer containing a hydrocarbon elastomer, and the laminated film may include one or a plurality of B2 layers. In particular, the film is capable of exhibiting further enhanced stretchability in a case where the laminated film includes one or a plurality of B2 layers as elastomer layers other than the outermost layer, i.e., as inner elastomer layers.

Examples of the elastomer for use in the polymer from which the B2 layer is formed include vinyl chloride elastomers, chlorinated polyethylene elastomers, polyester elastomers, polyamide elastomers, fluoro resin elastomers, polyurethane elastomers, and the like. Of these, polyurethane elastomers are preferred. Owing to the use of the polyurethane elastomer, the film is capable of exhibiting still further enhanced stretchability. The elastomer may be used either alone, or as a mixture of two or more types thereof.

Vinyl Chloride Elastomer There are, in general, three types of vinyl chloride elastomers listed below. The vinyl chloride elastomer may be a modified product such as a maleic anhydride-modified elastomer.

(1) high-molecular weight polyvinyl chloride (PVC)/plasticized PVC blend type (2) partially crosslinked PVC/plasticized PVC blend type (3) PVC/elastomer alloy type Chlorinated Polyethylene Elastomer The chlorinated polyethylene elastomer is a soft resin obtained by allowing polyethylene in the form of an aqueous suspension liquid or in a solvent such as carbon tetrachloride to react with a chlorine gas. The chlorinated polyethylene elastomer includes crystalline polyethylene moiety as a hard segment and a chlorinated polyethylene moiety as a soft segment.

Polyester Elastomer

The polyester elastomer is a multi-block copolymer that includes in the molecule, a polyester moiety as a hard segment, and a polyether moiety or a polyester moiety having a low glass transition temperature (Tg) as a soft segment.

Polyamide Elastomer

The polyamide elastomer is a multi-block copolymer that includes a polyamide moiety as a hard segment, and a polyether moiety or a polyester moiety having a low Tg as a soft segment. The polyamide component is selected from nylons 6, 66, 610, 11, 12, etc., and is typically nylon 6 or nylon 12. As a material for constituting the soft segment, a long chain polyol such as polyether diol or polyester diol may be used. Examples of the polyether include poly (oxytetramethylene) glycol (PTMG), poly(oxypropylene) glycol, and the like. Examples of the polyesterdiol include poly(ethylene adipate) glycol, poly(butylene-1,4-adipate) glycol, and the like.

Fluoro Resin Elastomer

The fluoro resin elastomer is an ABA type block copolymer composed of a fluoro resin moiety as a hard segment and a fluororubber moiety as a soft segment. The fluoro resin used for the hard segment may be a tetrafluoroethylene-ethylene copolymerized polymer, polyvinylidene fluoride (PVDF) or the like. The fluororubber used for the soft segment may be a vinylidene fluoride-hexafluoropropylene-tetrafluoroethylene ternary copolymerized polymer or the like.

Polyurethane Elastomer

The polyurethane elastomer (thermoplastic polyurethane elastomer (TPU)) is, for example, a linear multi-block copolymer that includes (1) as a hard segment, a polyurethane moiety obtained by a reaction of a short chain glycol (low-molecular weight polyol) with an isocyanate, and (2) as a soft segment, a polyurethane obtained by a reaction of a long chain glycol (high-molecular weight polyol) with an isocyanate. The "polyurethane" is a generic name of compounds having a urethane bond (—NHCOO—) obtained by a polyaddition reaction (urethanating reaction) of isocyanate (—NCO) with an alcohol (—OH).

The polyurethane elastomer is preferably used as the polymer from which the B2 layer is formed, in light of the advantage that the stretchability, the thermoformability and the like can be improved. Owing to, for example, the strong adhesion between the B2 layer and the A layer, the laminate is capable of exhibiting favorable flex resistance and the like.

TPU is constituted from a high-molecular weight polyol, an organic polyisocyanate, a chain extender, and the like. This high-molecular weight polyol is a substance having a plurality of hydroxyl groups, and may be obtained by polycondensation, addition polymerization (e.g., ring-opening polymerization), polyaddition, or the like. The high-molecular weight polyol is exemplified by a polyester polyol, a polyether polyol, a polycarbonate polyol, condensates thereof (e.g., a polyester-ether-polyol), and the like. The high-molecular weight polyol may be used either alone, or as a mixture of two or more types thereof. Of these, a polyester polyol and a polycarbonate polyol are preferred, and a polyester polyol is particularly preferred.

The polyester polyol may be produced, for example, according to a conventional method, by allowing an ester-formable derivative such as a dicarboxylic acid, an ester thereof or an anhydride thereof to be condensed with a low-molecular weight polyol by way of a direct esterification reaction or a transesterification reaction, or by subjecting a lactone to ring-opening polymerization.

Examples of the polyether polyol include polyethylene glycol, polypropylene glycol, polytetramethylene glycol, poly(methyltetramethylene) glycol, and the like. The polyether polyol may be used either alone, or as a mixture of two or more types thereof. Of these, polytetramethylene glycol is preferred.

As the polycarbonate polyol, for example, a substance obtained by condensation polymerization of an aliphatic diol having 2 to 12 carbon atoms (e.g., 1,4-butanediol, 1,5-pentanediol, 1,6-hexanediol, 1,8-octanediol, 1,10-decanediol) or a mixture of these with diphenyl carbonate, phosgene or the like may be suitably used.

The lower limit of the number average molecular weight of the high-molecular weight polyol is preferably 500, more preferably 600, and still more preferably 700. The upper limit of the number average molecular weight of the high-molecular weight polyol is preferably 8,000, more preferably 5,000, and still more preferably 3,000. When the number average molecular weight of the high-molecular weight polyol is less than the lower limit, miscibility with the organic polyisocyanate may be so high that the resulting TPU can have inferior resilience, whereby mechanical characteristics such as stretchability and thermoformability of the laminate obtained may be deteriorated. When the number average molecular weight of the high-molecular weight polyol is greater than the upper limit, miscibility with the organic polyisocyanate may be lowered, making it difficult to perform mixing in the polymerization procedure. As a result, TPU may not be produced stably due to generation of blocks of gelatinous matter, and the like. It is to be noted that the number average molecular weight of the high-molecular weight polyol is determined by measurement according to JIS K 1577 and calculation based on the hydroxyl value.

The organic polyisocyanate is not particularly limited, and well-known organic diisocyanate commonly employed in the production of TPU may be used. Examples of the organic diisocyanate include: aromatic diisocyanates such as 4,4'-diphenylmethanediisocyanate, tolylenediisocyanate, phenylenediisocyanate, xylylenediisocyanate, 1,5-naphthylene diisocyanate, 3,3'-dichloro-4,4'-diphenylmethanediisocyanate and toluylenediisocyanate; aliphatic diisocyanates (inclusive of alicyclic diisocyanates) such as hexamethylenediisocyanate, isophoronediisocyanate, 4,4'-dicyclohexylmethanediisocyanate and hydrogenated xylylenediisocyanate; and the like. Among these, 4,4'-diphenylmethanediisocyanate is preferred in light of the advantage that the strength and flex resistance of the laminate obtained can be improved. The organic diisocyanate may be used either alone, or in combination of two or more types thereof.

As the chain extender, any chain extender commonly employed in the production of TPU may be used, and a low-molecular weight compound having two or more active hydrogen atoms that can react with an isocyanate group in the molecule and having a molecular weight of 300 or less is suitably used. Examples of the chain extender include ethylene glycol, propylene glycol, 1,4-butanediol, 1,6-hexanediol, 1,4-bis(β-hydroxyethoxy)benzene 1,4-cyclohexanediol, and the like. Among these, an aliphatic diol having 2 to 10 carbon atoms is preferred, and 1,4-butanediol is particularly preferred, in light of the advantage that the stretchability and thermoformability of the laminate obtained can be more favorable. The chain extender may be used either alone, or as a mixture of two or more types thereof.

As to the method for producing TPU, the high-molecular weight polyol, the organic polyisocyanate and the chain extender described above are used and a well-known urethanating reaction technique is employed. Either the pre-polymer method or the one-shot method may be used for the production. Specifically, melt polymerization conducted substantially in the absence of a solvent is preferred, and continuous melt polymerization conducted through the use of a multi-screw extruder is particularly preferred.

The polymer for forming the B layer may contain only the elastomer, or may contain a polymer other than the elastomer. The B layer (the material for forming the B layer) may contain, in addition to the polymer, components such as a heat stabilizer, an ultraviolet ray absorbing agent, an antioxidant, a colorant and a filler.

Layer Constitution of Laminated Film

In the case where the film according to the present embodiment is structurally configured as the laminated film, the layer constitution of the laminated film is not particularly limited as long as the film includes one or a plurality of A layers and one or a plurality of B layers, and the film may also include a resin layer, etc., other than the A layer and the B layer.

The lower limit of the total number of the A layer and the B layer is preferably 3, more preferably 5, still more preferably 7, particularly preferably 9, and further particularly preferably 15. The upper limit of the total number of the A layer and the B layer is preferably 300, more preferably 200, still more preferably 100, and particularly preferably 50. It is preferred that the total number of layers included in the laminated film also falls within the above range. The configuration in which the number of laminated layers falls within the above range can inhibit consecutive generation of defects such as pinholes and cracks upon bending or the like of the film, and thus the film is capable of exhibiting enhanced durability. The film having the above configuration preferably has a laminated structure in which the A layer and the B layer are each laminated alternately (alternately laminated structure), and the alternately laminated structure preferably includes 7 or more layers. This configuration enables inhibition of consecutive generation of defects such as pinholes and cracks, and thus the film is capable of exhibiting further enhanced durability. The number of the A layers is preferably 2 or more, more preferably 5 or more, and still more preferably 10 or more. The number of the B layers is preferably 3 or more, more preferably 6 or more, and still more preferably 10 or more.

The lower limit of the sum of the thicknesses of the A layer(s) and the B layer(s) is preferably 10 μm, more preferably 15 μm, and still more preferably 30 μm. The upper limit thereof is preferably 500 μm, more preferably 300 μm, and still more preferably 100 μm. When the sum of the thicknesses of the A layer(s) and the B layer(s) is less than the lower limit, the strength, the flex resistance, the durability, the gas barrier properties and the like may be deteriorated. When the sum of the thicknesses is greater than the upper limit, the flexibility, the moldability and the like may be deteriorated, which may result in lower flex resistance and increased production costs. The sum of the thicknesses of the layers as referred to herein means the sum of the average thicknesses of the individual layers. The average thickness of each layer herein means an average value of the thicknesses measured at randomly selected 10 cross sections.

The lower limit of the average thickness of each of the A layers is preferably 0.1 μm, more preferably 0.2 μm, and still more preferably 0.3 μm. The upper limit thereof is preferably 15 μm, more preferably 5 μm, still more preferably 3 μm, even more preferably 2 μm, further more preferably 1 μm, and particularly preferably 0.5 μm. When molded to have an average thickness less than the lower limit, each of the A layers may fail to have uniform thickness, whereby the gas barrier properties, the durability and the like may be deteriorated. When each of the A layers has an average thickness greater than the upper limit, the flexibility and the like may be deteriorated, and as a result, the durability and the like may also be deteriorated.

The lower limit of the average thickness of each of the B layers (the B1 layer(s) and/or the B2 layer(s)) is preferably 0.1 μm, more preferably 0.5 μm, still more preferably 1 μm, and particularly preferably 2.5 μm. The upper limit thereof is preferably 30 μm, more preferably 15 μm, still more preferably 10 μm, even more preferably 8 μm, and particularly preferably 6 μm. When molded to have an average thickness less than the lower limit, each of the B layers may fail to have uniform thickness, whereby the durability may be deteriorated. In addition, the film may fail to exhibit sufficient flexibility. When each of the B layers has an average thickness greater than the upper limit, the interlayer adhesion and/or the gas barrier properties may be deteriorated.

In particular, the lower limit of the average thickness of the B1 layer laminated as the outermost layer is preferably 0.1 μm, more preferably 0.5 μm, still more preferably 1 μm, and particularly preferably 3 μm. The upper limit thereof is preferably 20 μm, more preferably 8 μm, and still more preferably 6 μm. Owing to the average thickness of the B1 layer within the above range, the adhesion between the B1 layer and a rubber material can be enhanced, for example, in the case where the B1 layer laminated as the outermost layer is formed from a polymer containing a styrene elastomer.

Examples of the laminated film having the layered structure preferred in the present embodiment include a laminated film 10 shown in FIG. 1(*a*) and a laminated film 20 shown in FIG. 1(*b*). The laminated film 10 shown in FIG. 1(*a*) includes a plurality of A layers 1, B1 layers 2 provided in a pair, and a plurality of B2 layers 3. In the laminated film 10, the B1 layers 2 are laminated on the outer faces, respectively, of the alternately laminated structure composed of the A layers 1 and the B2 layers 3 (i.e., on the surfaces of the corresponding B2 layers 3). The laminated film 20 shown in FIG. 1(*b*) includes a plurality of A layers 1 and a plurality of B1 layers 2. The laminated film 20 has an alternately laminated structure composed of the A layers 1 and the B1 layers 2, with two of the B1 layers 2 laminated as the outermost layers on both sides.

In each of the laminated films 10 and 20, two of the B1 layers 2 are disposed as the outermost layers on both sides. Owing to the B1 layers 2 disposed as the outermost layers on both sides, the adherence of each outermost layer to a conveyor roller can be inhibited during molding of the laminated film, and thus excessive stretching of the laminated film can be inhibited during molding. Each of the laminated films 10 and 20 has a layered structure that is symmetrical. Each layer can be efficiently molded by coextrusion to form such a symmetrical structure. It is not always required that two of the B1 layers 2 are laminated as the outermost layers on both sides. Only one of the B1 layers 2 may be laminated as the outermost layer on one side.

Oxygen Permeability Coefficient of Film

The upper limit of the oxygen permeability coefficient of the film according to the present embodiment may be 200 mL/(m$^2$·day·atm), and is preferably 170 mL/(m$^2$·day·atm), more preferably 150 mL/(m$^2$·day·atm), still more preferably 100 mL/(m$^2$·day·atm), and particularly preferably 50 mL/(m$^2$·day·atm). When the oxygen permeability coefficient is equal to or below the preferred upper limit, the film is capable of exhibiting further enhanced gas barrier properties. The lower limit of the oxygen permeability coefficient is not particularly limited, and is preferably 0.1 mL/(m²·day·atm) in light of the advantage of reduced production costs. The oxygen permeability coefficient of the film can be controlled according to the type of gas barrier resin to be used. In the case where the laminated film is provided, the oxygen permeability coefficient can be also controlled according to the thicknesses and the number of the A layers and the like.

Post/Pre Tensioned Film Length Ratio in MD

In the present embodiment, the upper limit of the post/pre tensioned film length ratio $L_2/L_1$ in MD may be 1.5, and is preferably 1.4, more preferably 1.3, still more preferably 1.28, and particularly preferably 1.25. When the length ratio $L_2/L_1$ is equal to or below the preferred upper limit, the film is usable with further minimized deterioration in gas barrier properties. The lower limit of the length ratio $L_2/L_1$ is not particularly limited. In light of the dimensional stability of the film under repeated use, the lower limit of the length ratio $L_2/L_1$ is preferably 0.7, more preferably 0.8, and particularly preferably 1.0. The film length ratio $L_2/L_1$ can be controlled according to the types of the gas barrier resin and the elastomer to be used. In the case where the laminated film is provided, the length ratio $L_2/L_1$ can be also controlled according to, for example, the thicknesses and the number of laminated layers, and/or the pressure at an air slit and the draw ratio during film molding as will be described below.

Elongation Ratio at Break of Film

With $E_{MD}$ denoting the elongation at break in MD and $E_{TD}$ denoting the elongation at break in TD, the lower limit of the elongation ratio at break $E_{TD}/E_{MD}$ of the film according to the present embodiment is preferably 0.9, more preferably 1.0, still more preferably 1.1, particularly preferably 1.2, and most preferably 1.3. The upper limit of the elongation ratio at break $E_{TD}/E_{MD}$ is preferably 1.7, and more preferably 1.6. When the elongation ratio at break $E_{TD}/E_{MD}$ falls within the above range, the film has enhanced impact resistance and is usable with further minimized deterioration in gas barrier properties. The elongation ratio at break $E_{TD}/E_{MD}$ of the film can be controlled according to the types of the gas barrier resin and the elastomer to be used. In the case where the laminated film is provided, the elongation ratio at break $E_{TD}/E_{MD}$ of the film can be also controlled according to, for example, the thicknesses and the number of laminated layers, and/or the pressure at an air slit and the draw ratio during film molding as will be described below. The film according to the present embodiment has an $E_{MD}$ of, for example, 200% or more and 800% or less. The film according to the present embodiment has an $E_{TD}$ of, for example, 200% or more and 800% or less.

Applications, etc.

Due to containing the gas barrier resin and the elastomer, the film according to the present embodiment is superior in gas barrier properties, stretchability and the like. Thus, the film according to the present embodiment is suited for use as a stretch film. In particular, the film according to the present embodiment is suited for use as a reusable stretch film because it is usable with minimized deterioration in gas barrier properties. The film according to the present embodiment may be formed into a molded product including, on the outer face of the film, a layer such as a protective layer, an embossed layer or a rubber layer, thus being suited for use as various types of sheet materials for a cover sheet and the like, an inner liner for a pneumatic tire, a silage film, a gasket, an inner package of an accumulator, an inflated ball, an air spring, etc.

Method for Producing Film

The following describes, as a method for producing a film according to an embodiment of the present invention, a method for producing the above-described laminated film including the A layer(s) and the B layer(s).

The method for producing a laminated film is not particularly limited as long as the A layer(s) and the B layer(s) can be favorably laminated and adhere to each other, and a well-known method such as coextrusion, pasting, coating, bonding or attaching may be employed.

The method for producing a laminated film preferably includes coextruding the polymer for forming the A layer (the material for forming the A layer) and the polymer for forming the B layer (the material for forming the B layer). This production method allows simultaneous formation of the A layer(s) and B layer(s), whereby a laminated film having the above-described characteristics can be easily and unfailingly formed.

According to the multilayer coextrusion process, the laminated film is formed as follows: the polymer for forming the A layer and the polymer for forming the B layer are heated and melted; extruders and/or pumps each feed the corresponding one of the polymers to an extrusion die through their respective flow paths; and the extrusion die extrudes the polymers from the extrusion die in multilayered form. As the extrusion die, a multimanifold die, a field block, a static mixer, or the like may be used.

The melt viscosity ratio is preferably as specified below in relation to the viscosity of the polymer for forming the A layer and the viscosity of the polymer for forming the B layer. The lower limit of the ratio $(\eta_B/\eta_A)$ of the viscosity of the polymer for forming the B layer $(\eta_B)$ to the viscosity of the polymer for forming the A layer $(\eta_A)$ at 210° C. and at a share rate of 1,000/sec is preferably 0.3, and more preferably 0.5. The upper limit of the melt viscosity ratio $(\eta_B/\eta_A)$ is preferably 2, and more preferably 1.5. When the melt viscosity ratio $(\eta_B/\eta_A)$ falls with the above range, the laminated film has a favorable external appearance, and favorable adhesion between the A layer and the B layer is provided, whereby the durability and the like of the laminated film can be improved.

The method for forming a laminated film preferably includes irradiating with electron beams, the structure (laminate) obtained by coextrusion. Due to the irradiation with electron beams, a crosslinking reaction occurs between layers, and thus the interlayer adhesive strength of the laminated film obtained can be enhanced. Various types of electron beam accelerators such as a Cockcroft-Walton accelerator, a Van de Graaff accelerator, a resonance transformer accelerator, an insulated core transformer accelerator, a Dynamitron accelerator and a high frequency accelerator may be used as an electron beam source.

Figure 2:
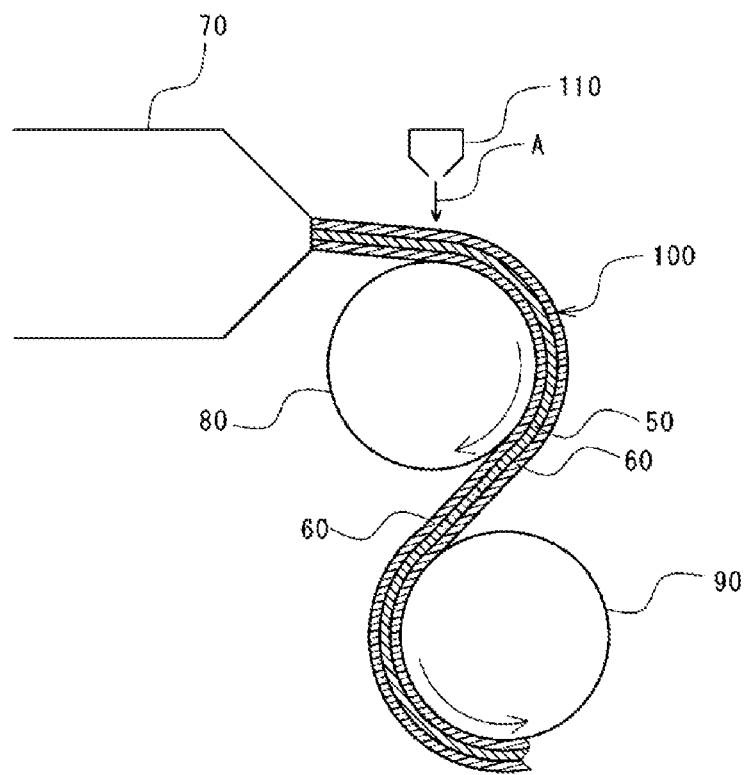
FIG. 2 is a schematic cross-sectional view for describing a method for producing the film of the one embodiment of the present invention.

As a specific example of the preferred production method in the present embodiment, the method for producing the laminated film having a three-layer structure in which the B layers are laminated on both sides of the A layer will be described below with reference to FIG. 2. A film forming apparatus shown in FIG. 2 includes: an extrusion die 70 for extruding polymers (polymer 60/polymer 50/polymer 60); a first conveyor roller 80 and a second conveyor roller 90 for conveying a laminate 100 formed from the polymers extruded from the extrusion die 70; and an air slit 110 disposed so as to face the laminate 100 on the first conveyor roller 80. The film forming apparatus provides a laminated film as follows: the polymer 50 for forming the A layer and the polymer 60 for forming the B layer are coextruded from the extrusion die 70; and then the laminate 100 formed from the polymers extruded from the extrusion die 70 is stretched while being conveyed by the first conveyor roller 80, the second conveyor roller 90 and the like. FIG. 2 shows, without hatching, the cross-sectional structures of the extrusion die 70, the first conveyor roller 80, the second conveyor roller 90 and the air slit 110.

With $R_1$ denoting the rotational speed of the first conveyor roller 80 and $R_2$ denoting the rotational speed of the second conveyor roller 90, achieving a higher rotational speed ratio ($R_2/R_1$) (hereinafter also referred to as "draw ratio") in conveying the laminate 100 promotes the orientation in MD of polymer crystals in the gas barrier resin contained in the polymer 50. The lower limit of the draw ratio is preferably 1.0, and more preferably 1.05. The upper limit of the draw ratio is preferably 1.5, and more preferably 1.4. When the draw ratio falls within the above range, the orientation in MD in the laminated film can be appropriately adjusted. Furthermore, by blowing air A from the air slit 110 onto the laminate 100 so as to accelerate a contact of the laminate 100 with the first conveyor roller 80, the time period for the stretching step is prolonged. Thus, this process can also promote the orientation in MD in the laminated film. In this process, the time period allowed for the stretching step can be controlled through adjustment of the pressure of air to be introduced into the air slit 110. The lower limit of the pressure of the air to be introduced into the air slit 110 is preferably 0.01 MPa, and more preferably 0.05 MPa. The upper limit of the pressure of the air A is preferably 0.5 MPa, and more preferably 0.4 MPa. When the pressure for introducing the air into the air slit 110 falls within the above range, the orientation in MD in the laminated film can be appropriately adjusted. The length ratio $L_2/L_1$ in MD and the elongation ratio at break $E_{TD}/E_{MD}$ of the laminated film tend to increase as the orientation in MD in the laminated film is promoted.

Molded Product

The molded product according to another embodiment of the present invention includes the above-described film according to the one embodiment described above. The molded product according to the present embodiment may be obtained by providing a layer such a protective layer, an embossed layer or a rubber layer on the outer face of the film. As described above, the molded product is suited for use as various types of sheet materials for a cover sheet and the like. The molded product according to the present embodiment includes the above-described film, thus being advantageous in that the film can maintain its gas barrier properties even after being stretched by application of tension on the film during molding of the product or after repetitive applications of pressure during use of the product.

It is preferred that the molded product according to the present embodiment further includes a diene rubber layer (C) (hereinafter also referred to as "C layer") laminated on the outer face of the film. Owing to this configuration, the molded product can be used as an inner liner for a pneumatic tire, an inner package of an accumulator, an inflated ball, an air spring, or the like.

Examples of the molded product having a preferred structure include a molded product 30 shown in FIG. 3(*a*) and a molded product 40 shown in FIG. 3(*b*). The molded product 30 shown in FIG. 3(*a*) is obtained by laminating a C layer 4 on one outer face of the laminated film 10 shown in FIG. 1(*a*). The molded product 40 shown in FIG. 3(*b*) is obtained by laminating a C layer 4 on one outer face of the laminated film 20 shown in FIG. 1(*b*).

The molded product according to the present embodiment may include the C layers laminated on the outer faces of the film on both sides. The molded product according to the present embodiment may also include, for example, resin layers other than the A layers, the B layers and the C layers.

The A layers and the B layers (the B1 layers and the B2 layers) of the molded product according to the present embodiment are similar to those of the laminated film described above.

The C layer is formed from a rubber material containing diene rubber. The diene rubber as referred to means rubber having carbon-carbon double bonds in the main chain. Examples of the diene rubber includes natural rubber (NR), isoprene rubber (IR), cis-1,4-polybutadiene (BR), syndiotactic 1,2-polybutadiene (1,2-BR), styrene-butadiene copolymer rubber (SBR), acrylonitrile-butadiene rubber (NBR), chloroprene rubber (CR), butyl rubber (IIR) and the like. The diene rubber may be used either alone, or as a mixture of two or more types thereof.

Although the C layer may be formed from the diene rubber alone, the C layer may contain components other the diene rubber, within the range not leading to impairment of the effects of the present invention. Other components may be, for example, a softening agent, an anti-aging agent, a vulcanizing agent, a vulcanization accelerator, a vulcanization acceleration aid, a scorch retarder, zinc white, stearic acid, and a filler.

The average thickness of each of the C layers is not particularly limited, and the lower limit thereof is preferably 10 μm, and more preferably 100 μm. The upper limit thereof is preferably 5 mm, and more preferably 1 mm.

With reference to FIGS. 3(*a*) and 3(*b*), the C layer 4 and the B1 layer 2 adjacent to the C layer 4 are bonded to each other at the interface therebetween through, for example, a cross-linking reaction (vulcanization reaction). In particular, in the case where the B1 layer 2 is formed from a polymer containing a styrene elastomer having a double bond, the crosslinking reaction can readily occur.

EXAMPLES

Hereinafter, the embodiments of the present invention will be described in more detail by way of Examples, but the present invention should not be construed as being in any way limited to these Examples.

Production of Pellets

Into a polymerization reactor equipped with a cooling device and a stirrer were charged 85.1 parts by mass of vinyl acetate, 26.4 parts by mass of methanol and, as a polymerization initiator, 0.56 parts by mass of a 2.0 g/L 2,2'-azobis-(4-methoxy-2,4-dimethylvaleronitrile) solution in methanol obtained by dissolution. While the resulting mixture was stirred, nitrogen replacement was carried out. Then, ethylene was introduced at 60° C. with a pressure of 3.7 MPa, and while a solution having a constitution identical to that of the methanol solution as the polymerization initiator was added at a rate of 1.7 parts by mass/hr with the same temperature and pressure being maintained, the resulting mixture was stirred for 4 hours to allow polymerization. Next, sorbic acid in an amount of 0.0426 parts by mass (0.05% by mass with respect to vinyl acetate charged) was dissolved in methanol to prepare a 1.5% by mass solution, which was added to the polymerization reactor. The degree of polymerization was 40% with respect to vinyl acetate charged. The resulting copolymerization reaction liquid was fed to a separation column. After unreacted vinyl acetate was eliminated from the top of the column by introduction of methanol vapor from the bottom of the column, a 40% by mass methanol solution of the copolymer was obtained.

The resulting methanol solution of the copolymer was introduced into a saponification reaction vessel, and then a solution of sodium hydroxide in methanol (85 g/L) was added so as to attain 0.5 equivalents with respect to the vinyl acetate component in the copolymer. Thereto was further added methanol to attain a copolymer concentration of 15% by mass. The temperature in the reaction vessel was elevated to 60° C., and the reaction was allowed to proceed for 5 hours while nitrogen gas was blown into the reactor. Thereafter, the reaction liquid was neutralized with acetic acid to stop the reaction, and the content was taken out from the reaction vessel and was left to stand at normal temperature, whereby precipitation as a particulate matter was permitted. By using a centrifugal separator, the precipitated particles were subjected to deliquoring, and then an operation including addition of a large amount of water and subsequent deliquoring was repeated to give EVOH having an ethylene unit content of 32.0 mol % and a degree of saponification of 99.5%.

The obtained EVOH was treated with an aqueous acetic acid solution (acetic acid concentration: 0.5 g/L) at a liquor ratio of 20 (mass ratio: aqueous acetic acid solution/ EVOH=20), and then dried and subjected to pelletization in an extruder, whereby an EVOH pellet (A-1) was obtained. The pellet (A-1) had a melt flow rate (MFR) of 5.8 g/10 min (at 190° C., under a load of 2,160 g) and an acetic acid content of 400 mass ppm. The Tg of the pellet (A-1) as determined by measurement using a DSC apparatus "Q2000" (TA Instruments) in accordance with JIS K 7121 (2012) was 57° C. The Tg of the resin used to provide the gas barrier layer as described below was determined in a manner similar to the above.

Through the use of the pellet (A-1) obtained as described above and a biaxial extruder "TEM-35BS" (screw diameter (D): 37 mm; screw length (L)/screw diameter (D)=52.5) manufactured by Toshiba Machine Co., Ltd., 1,2-epoxybutane was allowed to react with EVOH in the presence of an added catalyst under the extrusion conditions described below. Unreacted 1,2-epoxybutane was eliminated through a vent, and then an 8.0% by mass aqueous ethylenediamine tetraacetate trisodium hydrate solution was added as a catalyst deactivator. After pelletization, the pelletized matter was dried to give a pellet (A-2) that contained 1,2-epoxybutane-modified EVOH having the following structure as a structural unit (II) other than the ethylene unit and the vinyl alcohol unit.

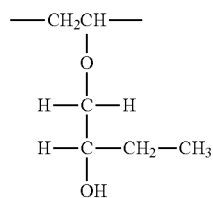

Extrusion Conditions
Cylinder, die temperature settings: resin feed port/cylinder part inlet/adaptor/die=160° C./200° C./240° C./240° C.
Rotational speed of screw: 400 rpm
Ethylene-vinyl alcohol copolymer feed rate: 15 kg/hr
1,2-epoxybutane feed rate: 2.8 kg/hr (pressure during feeding: 6 MPa)
Catalyst solution feed rate: 0.32 kg/hr
Procedure for preparing catalyst: Zinc acetylacetonato monohydrate in an amount of 28 parts by mass was mixed with 957 parts by mass of 1,2-dimethoxyethane, whereby a mixture was obtained. To the mixture obtained was added 15 parts by mass of trifluoromethane sulfonic acid with stirring to give a catalyst solution. In other words, a solution was prepared containing 1 mol of trifluoromethane sulfonic acid mixed with 1 mol of zinc acetylacetonato monohydrate.

Aqueous catalyst deactivator solution feed rate: 0.15 kg/hr

The obtained pellet (A-2) had an MFR of 3.5 g/10 min (at 190° C., under a load of 2,160 g). The pellet (A-2) had an acetic acid content of 420 mass ppm, a zinc ion content of 140 mass ppm, a sodium content of 140 mass ppm, a phosphorous compound content of 20 mass ppm in terms of phosphate radical equivalent, and a trifluoromethanesulfonic acid content of 290 mass ppm. The proportion of the structural unit (II) introduced in EVOH of the pellet (A-2) (degree of modification with 1,2-epoxybutane) as determined by $^1$H-NMR (internal standard substance: tetramethylsilane, solvent: $d_6$-DMSO) was 6.7 mol %.

A pellet was produced under the conditions similar to those in the preparation of the pellet (A-2) through the use of the pellet (A-1) except that epoxypropane was used in place of epoxybutane. As a result, a pellet (A-3) that contained EVOH having an ethylene unit content of 32.0 mol % was obtained with the degree of modification with epoxypropane being 6.7 mol %.

Among the resins used to provide the gas barrier layers of Examples, resins other than the above-described (A-1), (A-2) and (A-3) are specifically listed below.

(A-4) EVOH "EVAL L171" (Kuraray Co., Ltd), ethylene unit content: 27 mol %

(A-5) EVOH "EVAL E171" (Kuraray Co., Ltd), ethylene unit content: 44 mol %

(A-6) nylon 6 "AMILAN CM1021FS" (Toray Industries, Inc.)

(A-7) polylactic acid (PLA) "PLA6201D" (NatureWorks Japan, Ltd.)

Production of Polymethallyl Alcohol (A-8)

In an autoclave equipped with a stirrer and a collecting tube, nitrogen replacement was carried out. Thereafter, 100 parts by mass of purified methyl methacrylate, 0.0052 parts by mass of 2,2'-azobis(2-methylpropionitrile) and 0.28 parts by mass of n-octyl mercaptan were charged into the autoclave and the mixture was stirred to give a raw liquid. Then, nitrogen was supplied to the raw liquid to remove oxygen remaining in the raw liquid. A tank reactor connected to the autoclave through piping was filled about two-thirds full of the raw liquid. First, a batchwise reaction was started while the temperature was kept constant at 140° C. When the polymerization conversion rate reached 55%, the raw liquid was supplied from the autoclave to the tank reactor at a flow rate adjusted to attain an average residence time of 150 minutes, and the reaction liquid was extracted from the tank reactor at a flow rate equivalent to the flow rate of the raw liquid supplied, and the temperature was kept constant at 140° C., whereby switching to the continuous flow polymerization was made. After the switching, the polymerization conversion rate in a steady state was 55%.

The reaction liquid extracted from the tank reactor in the steady state was supplied to a multiple heat exchanger at an internal temperature of 230° C. at a flow rate adjusted to attain an average residence time of 2 minutes, and thus the reaction liquid was heated therein. Subsequently, the heated reaction liquid was introduced into an adiabatic flash evaporator to remove a volatile component containing an unreacted monomer as a principle component, whereby a molten resin was obtained. The molten resin cleared of the volatile component was supplied to a biaxial extruder at an internal temperature of 260° C., was discharged in a strand form, and was cut with a pelletizing machine, thereby giving a methacrylate resin in pellet form having a Tg of 120° C., with the proportion of the structural unit derived from methyl methacrylate being 100% by mass.

Subsequently, 250 parts by mass of lithium aluminum hydride were charged into a reaction vessel equipped with a condenser, and nitrogen replacement was carried out. After 3,000 parts by mass of N-methylmorpholine were added, the resulting mixture was heated to 130° C. and was refluxed. A solution containing 600 parts by mass of the methacrylate resin synthesized as described above and 24 kg (6,000 parts by mass) of N-methylmorpholine was added thereto. After the completion of the dropwise addition, the mixture was further refluxed for 4 hours. Then, 1,000 parts by mass of ethyl acetate were added dropwise to deactivate an unreacted hydrate. Furthermore, 5,000 parts by mass of a 50% by mass aqueous phosphoric acid solution were added dropwise. After being cooled, the resulting mixture underwent centrifugal separation, thereby being separated into a supernatant liquid and solid contents. The obtained supernatant liquid was added to distilled water to allow precipitation of a polymer 1. Meanwhile, to the obtained solid contents were added 10,000 parts by mass of ethanol, and the resulting mixture was heated to achieve dissolution at 60° C. for 1 hour. Thereafter, the mixture was filtered through a glass filter. The resulting filtrate was concentrated in an evaporator, and was added to distilled water to allow precipitation of a polymer 2. The polymers 1 and 2 obtained after the precipitation were combined and the resulting mixture was added to distilled water heated to 100° C., and was boiled, thereby being sufficient washed. The washing was followed by filtration, drying in a hot-air drier at 80° C. for 3 hours, and subsequent drying at 120° C. for 24 hours, whereby polymethallyl alcohol as a resin (A-8) was obtained.

Production of TPU Pellet (B2-1)

While being heated and in a liquid state, 74.2% by mass of polytetramethylene ether glycol ("PTMEG2000" (Mitsubishi Chemical Corporation)) containing 20 mass ppm of dibutyltin diacetate; 21.4% by mass of 4,4'-diphenylmethane diisocyanate; 3.9% by mass of 1,4-butanediol; and 0.6% by mass of 3-methyl-1,5-pentanediol were continuously supplied by batch to a biaxial extruder (L/D=30) by using a metering pump, and underwent polymerization at 260° C. Subsequently, the blended matter was subjected to pelletization, whereby a TPU pellet (B2-1) was produced.

Production of TPU Pellet (B2-2)

Polyesterdiol having a number average molecular weight of 1,000 with the number of hydroxyl groups per molecule being 2.0 mol was obtained by a reaction of 1,4-butanediol and adipic acid. A mixture of 68.8% by mass of the obtained polyesterdiol with 27.5% by mass of 4,4'-diphenylmethane diisocyanate and 3.7% by mass of 1,4-butanediol was melted and kneaded for 20 minutes in a multi-screw extruder (die temperature: 260° C.), whereby TPU (Shore A hardness as determined in accordance with JIS B 7727 (2000): 85) was produced. Subsequently, a TPU pellet (B2-2) was obtained through pelletization.

Among the elastomers used to provide the inner elastomer layers of Examples and Comparative Examples, elastomers other than the above-described (B2-1) and (B2-2) are specifically listed below.

(B2-3) ether-based TPU "KURAMIRON 9180" (Kuraray Co., Ltd.)

(B2-4) polyamide elastomer pellet "E40-S1" (Daicel-Evonik Ltd.)

(B2-5) polyamide 12 elastomer pellet "UBESTA XPA" (Ube Industries, Ltd.)

(B2-6) maleic anhydride-modified ethylene-butene copolymer elastomer pellet "TAFMER MH7010" (Mitsui Chemicals, Inc.)

(B2-7) maleic anhydride-modified ethylene-propylene copolymer elastomer pellet "TAFMER MP0610" (Mitsui Chemicals, Inc.)

The elastomers used to provide the outer elastomer layers of Examples and Comparative Examples are specifically listed below.

(B1-1) epoxy-modified SBS "EPOFRIEND AT501" (Daicel Corporation)

(B1-2) epoxy-modified SBS "EPOFRIEND CT310" (Daicel Corporation)

(B1-3) maleic anhydride-modified SBS "TUFPRENE 912" (Asahi Kasei Chemicals Corporation)

(B1-4) unmodified SBS (styrene/butadiene ratio: 40/60) "TUFPRENE A" (Asahi Kasei Chemicals Corporation)

(B1-5) SIS (styrene/isoprene ratio: 20/80) "SIS 5250" (JSR Corporation) (B1-6) SIS (styrene/isoprene ratio: 48/52) "Quintac 3390" (Nippon ZEON Co., Ltd.)

(B1-7) maleic anhydride-modified hydrogenated SBS "FG 1901" (Kraton Polymer Japan)

(B1-8) olefin thermoplastic elastomer "THERMORUN 3755B/N" (Mitsubishi Chemical Corporation)

Example 1

In the form of the EOVH pellet (A-2), the TPU pellet (B2-1) and the SBS pellet (B1-1), the respective polymers in a molten state at 185° C. were supplied to a coextruder by using a feedblock designed for a total of 37 layers made up of "gas barrier layers and inner elastomer layers" (35 layers) and "outer elastomer layers" (2 layers) so as to obtain a laminated film in which 17 gas barrier layers (EVOH pellet (A-2) and 18 inner elastomer layers (TPU pellet (B2-1)) were each laminated alternately and the outer elastomer layers (SBS pellet (B1-1)) were laminated as outermost layers on both sides. Subsequently, coextrusion was performed, whereby the polymers were allowed to interflow and formed into a multilayer laminate. In the feedblock, the thicknesses of the flow paths of the polymers for forming the layers varied from path to path in a manner to show a gradual increase from the surface-layer side toward the mid-layer side, whereby the layers constituting the extruded laminate had uniform thickness. The laminate obtained as described above and composed of 37 layers in total was extruded on a casting roller (i.e., the first conveyor roller 80 in FIG. 2) whose surface was kept at 30° C. An air slit with an air nozzle aperture of 0.3 mm was placed at a height of 3 cm from the casting roller, and the ratio of the rotational speed $R_2$ of the cooling roller (i.e., the second conveyor roller 90 in FIG. 2) to the rotational speed $R_1$ of the casting roller was made controllable, thereby adjusting the draw ratio ($R_2/R_1$) to be 1.0. Then, the air was blown from the air slit at a controlled pressure of 0.2 MPa so as to bring the laminate into contact with the casting roller, and the laminate was wound with the cooling roller, whereby the laminate film of Example 1 was obtained. The shapes of the flow paths and total amount of discharge were predetermined such that the time elapsed between the instant of the interflow of a melt of the EVOH pellet (A-2), a melt of the TPU pellet (B2-1) and a melt of the SBS pellet (B1-1) and the instant of solidification of the melts by rapid cooling on the casting roller was about 4 minutes.

When the laminated film obtained as described above was observed in cross section with a shape measurement laser microscope "VK-X200" (Keyence Corporation) for measurement of the average thickness of each single layer at randomly selected 10 points, each of the gas barrier layers had an average thickness of 0.3 μm, each of the inner elastomer layers had an average thickness of 2.9 μm, and each of the outer elastomer layers had an average thickness of 5.0 μm. The sum of the thicknesses of all the layers was 67.3 μm.

Examples 2 to 32 and Comparative Examples 1, 4, and 5

The laminated films of Examples 2 to 32 and the laminated films of Comparative Examples 1, 4, and 5 were obtained as in Example 1 described above except that the types of polymers (resin materials) for forming the layers, the number of layers, the average thickness of each layer, the air pressure at the air slit and the draw ratio were changed as shown in Tables 1 and 2.

TABLE 1

| | | Layer constitution | | | | | | | | | Production condition | |
|---|---|---|---|---|---|---|---|---|---|---|---|---|
| | | gas barrier layer | | | | inner elastomer layer | | | outer elastomer layer | | | |
| | total number of layers | type | Tg (° C.) of resin | number of layers | average thickness of each layer (μm) | type | number of layers | average thickness of each layer (μm) | type | number of layers | average thickness of each layer (μm) | air pressure at air slit (MPa) | draw ratio |
| Example 1 | 37 | A-2 | 55 | 17 | 0.3 | B2-1 | 18 | 2.9 | B1-1 | 2 | 5.0 | 0.2 | 1.0 |
| Example 2 | 37 | A-2 | 55 | 17 | 0.3 | B2-1 | 18 | 2.9 | B1-1 | 2 | 5.0 | none | 1.1 |
| Example 3 | 37 | A-2 | 55 | 17 | 0.3 | B2-1 | 18 | 2.9 | B1-1 | 2 | 5.0 | 0.3 | 1.0 |
| Example 4 | 37 | A-2 | 55 | 17 | 0.3 | B2-1 | 18 | 2.9 | B1-1 | 2 | 5.0 | 0.4 | 1.0 |
| Example 5 | 37 | A-2 | 55 | 17 | 0.3 | B2-1 | 18 | 2.9 | B1-1 | 2 | 5.0 | 0.45 | 1.0 |
| Example 6 | 37 | A-2 | 55 | 17 | 0.3 | B2-1 | 18 | 2.9 | B1-1 | 2 | 5.0 | none | 1.0 |
| Example 7 | 37 | A-3 | 55 | 17 | 0.3 | B2-1 | 18 | 2.9 | B1-1 | 2 | 5.0 | none | 1.0 |
| Example 8 | 37 | A-1 | 57 | 17 | 0.3 | B2-1 | 18 | 2.9 | B1-1 | 2 | 5.0 | none | 1.0 |
| Example 9 | 37 | A-4 | 60 | 17 | 0.3 | B2-1 | 18 | 2.9 | B1-1 | 2 | 5.0 | none | 1.0 |
| Example 10 | 37 | A-5 | 53 | 17 | 0.3 | B2-1 | 18 | 2.9 | B1-1 | 2 | 5.0 | none | 1.0 |
| Example 11 | 37 | A-6 | 48 | 17 | 0.3 | B2-1 | 18 | 2.9 | B1-1 | 2 | 5.0 | none | 1.0 |
| Example 12 | 37 | A-7 | 57 | 17 | 0.3 | B2-1 | 18 | 2.9 | B1-1 | 2 | 5.0 | none | 1.0 |
| Example 13 | 37 | A-2 | 55 | 17 | 0.3 | B2-2 | 18 | 2.9 | B1-1 | 2 | 5.0 | none | 1.0 |
| Example 14 | 37 | A-2 | 55 | 17 | 0.3 | B2-3 | 18 | 2.9 | B1-1 | 2 | 5.0 | none | 1.0 |
| Example 15 | 37 | A-2 | 55 | 17 | 0.3 | B2-4 | 18 | 2.9 | B1-1 | 2 | 5.0 | none | 1.0 |
| Example 16 | 37 | A-2 | 55 | 17 | 0.3 | B2-5 | 18 | 2.9 | B1-1 | 2 | 5.0 | none | 1.0 |
| Example 17 | 37 | A-2 | 55 | 17 | 0.3 | B2-6 | 18 | 2.9 | B1-1 | 2 | 5.0 | none | 1.0 |
| Example 18 | 37 | A-2 | 55 | 17 | 0.3 | B2-7 | 18 | 2.9 | B1-1 | 2 | 5.0 | none | 1.0 |

TABLE 2

| | | Layer constitution | | | | | | | | | Production condition | |
|---|---|---|---|---|---|---|---|---|---|---|---|---|
| | | gas barrier layer | | | | inner elastomer layer | | | outer elastomer layer | | | |
| | total number of layers | type | Tg (° C.) of resin | number of layers | average thickness of each layer (μm) | type | number of layers | average thickness of each layer (μm) | type | number of layers | average thickness of each layer (μm) | air pressure at air slit (MPa) | draw ratio |
| Example 19 | 37 | A-2 | 55 | 17 | 0.3 | B2-1 | 18 | 2.9 | B1-2 | 2 | 5.0 | none | 1.0 |
| Example 20 | 37 | A-2 | 55 | 17 | 0.3 | B2-1 | 18 | 2.9 | B1-3 | 2 | 5.0 | none | 1.0 |
| Example 21 | 37 | A-2 | 55 | 17 | 0.3 | B2-1 | 18 | 2.9 | B1-4 | 2 | 5.0 | none | 1.0 |
| Example 22 | 37 | A-2 | 55 | 17 | 0.3 | B2-1 | 18 | 2.9 | B1-5 | 2 | 5.0 | none | 1.0 |
| Example 23 | 37 | A-2 | 55 | 17 | 0.3 | B2-1 | 18 | 2.9 | B1-6 | 2 | 5.0 | none | 1.0 |
| Example 24 | 37 | A-2 | 55 | 17 | 0.3 | B2-1 | 18 | 2.9 | B1-7 | 2 | 5.0 | none | 1.0 |
| Example 25 | 21 | A-2 | 55 | 9 | 0.6 | B2-1 | 10 | 5.2 | B1-8 | 2 | 5.0 | none | 1.0 |
| Example 26 | 21 | A-2 | 55 | 9 | 0.6 | B2-1 | 10 | 5.2 | B1-1 | 2 | 5.0 | none | 1.0 |
| Example 27 | 21 | A-2 | 55 | 9 | 0.6 | B2-1 | 10 | 1.5 | B1-1 | 2 | 5.0 | none | 1.0 |
| Example 28 | 21 | A-2 | 55 | 9 | 0.6 | B2-1 | 10 | 0.5 | B1-1 | 2 | 3.0 | none | 1.0 |
| Example 29 | 20 | A-2 | 55 | 9 | 0.6 | B2-1 | 10 | 0.5 | B1-1 | 1 | 1.5 | none | 1.0 |
| Example 30 | 5 | A-2 | 55 | 1 | 5.0 | B2-1 | 2 | 2.5 | B1-1 | 2 | 1.0 | none | 1.0 |
| Example 31 | 5 | A-2 | 55 | 1 | 1.0 | B2-1 | 2 | 2.5 | B1-1 | 2 | 1.0 | none | 1.0 |
| Example 32 | 5 | A-2 | 55 | 1 | 0.5 | B2-1 | 2 | 2.5 | B1-1 | 2 | 1.0 | none | 1.0 |
| Comparative Example 1 | 37 | A-2 | 55 | 17 | 0.3 | B2-1 | 18 | 2.9 | B1-1 | 2 | 5.0 | 0.5 | 1.0 |
| Comparative Example 4 | 35 | A-2 | 55 | 17 | 0.3 | B2-1 | 18 | 2.9 | none | | | 0.2 | 1.0 |
| Comparative Example 5 | 37 | A-8 | 80 | 17 | 0.3 | B2-1 | 18 | 2.9 | B1-1 | 2 | 5.0 | none | 1.0 |

Evaluations of Physical Properties

The laminated film obtained were evaluated for various physical properties according to the procedure described below. The results are shown in Tables 3 and 4.

Oxygen Permeability Coefficient $OTR_1$

By using an oxygen permeability coefficient measuring apparatus MOCONOX-TRAN 2/20 type (Modern Controls Inc.), the oxygen permeability coefficient of the laminated film obtained was determined at 20° C. and at a relative humidity of 65% in accordance with the method (equal pressure method) prescribed in MS K 7126-2 (2006). The oxygen permeability coefficient determined by the measurement was denoted by $OTR_1$.

Post/Pre Tensioned Film Length Ratio $L_2/L_4$ in MD

A sample measuring 20 cm per side in MD and TD was cut away from the laminated film, and a square measuring 10 cm per side in MD and TD was drawn on the central part of the sample. The length of the line segment passing through the barycenter of the square and extending in MD from one side to another side of the square was denoted by $L_1$. With both ends of the sample in MD being held, tension was applied at 20° C. such that the sample was stretched in MD to gain a twofold increase in length. The sample was kept stretched for 30 seconds, and then the tension was released over 10 seconds. After the tension was released, the length in MD of the segment corresponding to the segment that had the measured length $L_1$ as described above was measured and denoted by $L_2$. Then, $L_2$ was divided by $L_1$ to give the post/pre tensioned film length ratio $L_2/L_1$ in MD.

Elongation Ratio at Break $E_{TD}/E_{MD}$

The elongation at break ($E_{MD}$) of the laminated film in MD and the elongation at break ($E_{TD}$) of the laminated film in TD were determined at 23° C. and at a relative humidity of 50% in accordance with ISO527-2, and then the ratio $E_{TD}/E_{MD}$ was calculated.

Post/Pre Tensioned Film Oxygen Permeability Coefficient Ratio $OTR_2/OTR_1$

By using the oxygen permeability coefficient measuring apparatus MOCONOX-TRAN 2/20 type (Modern Controls Inc.), the oxygen permeability coefficient of the laminated film subjected to measurement of the length ratio $L_2/L_1$ in MD was determined at 20° C. and at a relative humidity of 65% in accordance with the method (equal pressure method) prescribed in JIS K 7126-2 (2006). The oxygen permeability coefficient determined by the measurement was denoted by $OTR_2$. Then, $OTR_2$ was divided by $OTR_1$ measured as described above, thereby giving the oxygen permeability coefficient ratio $OTR_2/OTR_1$. In the case where the ratio was 1.5 or less, it was determined that after application of tension, the film was still usable with minimized deterioration in gas barrier properties.

Impact Resistance

By using "Film Impact Tester" (Toyo Seiki Seisaku-sho, Ltd.) with a hemispherical impact head ½ inches in diameter, the impact strength was measured in an atmosphere at 23° C. and at a relative humidity of 50%. Measurement was carried out ten times at each level, and the 10 measurements were averaged. The impact resistance of the film was evaluated in accordance with the following evaluation criteria.

A: the impact strength being 20 J or more
B: the impact strength being 18 J or more and less than 20 J
C: the impact strength being 16 J or more and less than 18 J
D: the impact strength being 14 J or more and less than 16 J
E: the impact strength being less than 14 J

TABLE 3

| | $OTR_1$ mL/(m² · day · atm) | $L_2/L_1$ | $E_{TD}/E_{MD}$ | $OTR_2/OTR_1$ | Impact resistance |
|---|---|---|---|---|---|
| Example 1 | 16.0 | 1.13 | 1.34 | 1.11 | A |
| Example 2 | 16.0 | 1.12 | 1.18 | 1.02 | B |
| Example 3 | 16.0 | 1.22 | 1.45 | 1.12 | A |
| Example 4 | 16.0 | 1.35 | 1.53 | 1.24 | A |
| Example 5 | 16.0 | 1.42 | 1.62 | 1.38 | A |
| Example 6 | 16.0 | 1.02 | 1.05 | 0.86 | C |
| Example 7 | 16.0 | 1.43 | 1.07 | 0.87 | C |
| Example 8 | 1.3 | 1.14 | 1.05 | 1.17 | C |
| Example 9 | 0.7 | 1.23 | 1.18 | 1.19 | B |
| Example 10 | 8.0 | 1.08 | 1.05 | 1.13 | C |
| Example 11 | 3.6 | 1.25 | 1.18 | 1.18 | B |
| Example 12 | 1.0 | 1.18 | 1.05 | 1.03 | C |
| Example 13 | 16.0 | 1.15 | 1.03 | 1.05 | C |
| Example 14 | 16.0 | 1.23 | 1.08 | 1.13 | C |
| Example 15 | 16.0 | 1.21 | 1.03 | 1.19 | C |
| Example 16 | 16.0 | 1.24 | 1.18 | 1.16 | B |
| Example 17 | 16.0 | 1.28 | 0.93 | 1.17 | C |
| Example 18 | 16.0 | 1.25 | 0.97 | 1.13 | C |

TABLE 4

| | $OTR_1$ mL/(m² · day · atm) | $L_2/L_1$ | $E_{TD}/E_{MD}$ | $OTR_2/OTR_1$ | Impact resistance |
|---|---|---|---|---|---|
| Example 19 | 16.0 | 1.03 | 1.01 | 0.93 | C |
| Example 20 | 16.0 | 1.05 | 1.06 | 0.95 | C |
| Example 21 | 16.0 | 1.01 | 0.97 | 0.93 | C |
| Example 22 | 16.0 | 1.04 | 1.06 | 0.95 | C |
| Example 23 | 16.0 | 1.03 | 0.98 | 0.93 | C |
| Example 24 | 16.0 | 1.07 | 0.97 | 0.93 | C |
| Example 25 | 16.0 | 1.11 | 0.97 | 0.93 | D |
| Example 26 | 16.0 | 1.22 | 1.08 | 1.11 | C |
| Example 27 | 16.0 | 1.23 | 1.07 | 1.18 | C |
| Example 28 | 16.0 | 1.31 | 1.06 | 1.25 | D |
| Example 29 | 16.0 | 1.43 | 1.05 | 1.31 | D |
| Example 30 | 16.0 | 1.47 | 1.05 | 1.38 | D |
| Example 31 | 80.0 | 1.44 | 1.03 | 1.34 | D |
| Example 32 | 160.0 | 1.42 | 1.08 | 1.46 | D |
| Comparative Example 1 | 16.0 | 1.56 | 1.73 | 1.58 | A |
| Comparative Example 4 | 16.0 | 1.82 | 1.87 | 1.92 | A |
| Comparative Example 5 | 0.1 | 1.17 | 1.05 | >10 | E |

As is clear from Tables 3 and 4, the oxygen permeability coefficient ratio $OTR_2/OTR_1$ was 1.5 or less in every Example. In contrast, the oxygen permeability coefficient ratio $OTR_2/OTR_1$ was greater than 1.5 in every Comparative Example. These results indicate that according to the embodiments of the present invention, the film is usable with minimized deterioration in gas barrier properties.

Comparisons made among Examples reveal that the impact resistance in Examples 1 to 5, 9, 11 and 16, in which the elongation ratio at break $E_{TD}/E_{MD}$ was 1.1 or more, was more favorable (rated A or B) than the impact resistance in Examples in which the elongation ratio at break $E_{TD}/E_{MD}$ was less than 1.1. These results indicate that adjusting the elongation ratio at break $E_{TD}/E_{MD}$ to be 1.1 or more can improve the impact resistance.

INDUSTRIAL APPLICABILITY

The present invention provides the film usable with minimized deterioration in gas barrier properties, the molded product including the same, and the method for producing a film.

EXPLANATION OF THE REFERENCE SYMBOLS

1 A layer (gas barrier layer (A))
2 B1 layer (elastomer layer (B1))
3 B2 layer (elastomer layer (B2))
4 C layer (diene rubber layer (C))
10, 20 laminated film
30, 40 molded product
50 polymer for forming A layer
60 polymer for forming B layer
70 extrusion die
80 first conveyor roller
90 second conveyor roller
100 laminate
110 air slit

The invention claimed is:

1. A film, comprising:
   at least one gas barrier layer (A) formed from a polymer comprising a gas barrier resin having a glass transition temperature of 70° C. or below; and
   at least one elastomer layer (B) formed from a polymer comprising an elastomer, wherein the at least one elastomer layer (B) comprises at least one elastomer layer (B1) formed from a polymer comprising a hydrocarbon elastomer, wherein at least one of the at least one elastomer layer (B1) is laminated as an outermost layer;
   wherein
   the film has an oxygen permeability coefficient of 200 mL/(m²·day·atm) or less, and
   in a case where tension is applied to stretch the film in a machine direction (MD) at 20° C. such that a twofold increase in length of the film is kept for 30 seconds, and then the tension is released, a ratio $L_2/L_1$ is 1.5 or less, where $L_1$ denotes a length of the film in the MD prior to application of the tension and $L_2$ denotes a length of the film in the MD subsequent to release of the tension, and
   wherein the film is produced by a film forming apparatus comprising, in this order: an extrusion die for extruding polymers which form each layer; and a first conveyor roller and a second conveyor roller for conveying a laminate formed from the polymers extruded from the extrusion die,
   wherein air pressure at an air slit provided between the extrusion die and the first conveyor roller is 0.01 MPa or more and 0.45 MPa or less, and a draw ratio ($R_2/R_1$), being a ratio of a rotational speed ($R_2$) of the second conveyor roller to a rotational speed ($R_1$) of the first conveyor roller, is 1.0 or more and 1.5 or less.

2. The film of claim 1, wherein an elongation ratio at break $E_{TD}/E_{MD}$ of the film is 0.9 or more and 1.7 or less, where $E_{MD}$ denotes an elongation at break in the MD and $E_{TD}$ denotes an elongation at break in a transverse direction (TD).

3. The film of claim 1, wherein the gas barrier resin is an ethylene-vinyl alcohol copolymer.

4. The film of claim 1, wherein a total number of layers of the at least one gas barrier layer (A) and the at least one elastomer layer (B) is 7 or more.

5. The film of claim 1, wherein the film has a laminated structure in which the at least one gas barrier layer (A) and the at least one elastomer layer (B) are each laminated alternately.

6. The film of claim 1, wherein the at least one elastomer layer (B1) comprises a styrene elastomer having a double bond.

7. The film of claim 1, wherein the at least one elastomer layer (B) further comprises an elastomer layer (B2) formed from a polymer other than the polymer comprising a hydrocarbon elastomer.

8. The film of claim 7, wherein the polymer from which the elastomer layer (B2) is formed comprises a polyurethane elastomer.

9. A molded product, comprising the film of claim 1.

10. The molded product of claim 9, further comprising a diene rubber layer (C) laminated on an outer face of the film.

11. A method for producing the film of claim 1, the method comprising coextruding:
    the polymer comprising the gas barrier resin; and
    the polymer comprising the elastomer,
    wherein the coextruding is performed by the film forming apparatus.

* * * * *